US012154342B2

(12) United States Patent
Yamazaki et al.

(10) Patent No.: US 12,154,342 B2
(45) Date of Patent: Nov. 26, 2024

(54) SURVEILLANCE SYSTEM, SURVEILLANCE APPARATUS, SURVEILLANCE METHOD, AND NON-TRANSITORYCOMPUTER-READABLE STORAGE MEDIUM

(71) Applicant: NEC Corporation, Tokyo (JP)

(72) Inventors: Daiki Yamazaki, Tokyo (JP); Ryuji Wakakusa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 130 days.

(21) Appl. No.: 17/795,311

(22) PCT Filed: Jan. 29, 2020

(86) PCT No.: PCT/JP2020/003213
§ 371 (c)(1),
(2) Date: Jul. 26, 2022

(87) PCT Pub. No.: WO2021/152736
PCT Pub. Date: Aug. 5, 2021

(65) Prior Publication Data
US 2023/0050235 A1    Feb. 16, 2023

(51) Int. Cl.
*G06V 20/52*   (2022.01)
*G06T 7/70*    (2017.01)
*G06V 10/74*   (2022.01)
*G06V 40/16*   (2022.01)

(52) U.S. Cl.
CPC .............. *G06V 20/52* (2022.01); *G06T 7/70* (2017.01); *G06V 10/761* (2022.01); *G06V 40/172* (2022.01); *G06V 2201/07* (2022.01)

(58) Field of Classification Search
CPC .... G06V 20/52; G06V 10/761; G06V 40/172; G06V 2201/07
See application file for complete search history.

(56) References Cited

U.S. PATENT DOCUMENTS

| 10,949,983 B2* | 3/2021 | Komoto ................. H04N 21/44 |
| 11,967,174 B2* | 4/2024 | Hasegawa ............. H04L 67/568 |

(Continued)

FOREIGN PATENT DOCUMENTS

| JP | H07-296068 A | 11/1995 |
| JP | 2003-141657 A | 5/2003 |
| JP | 2008-204219 A | 9/2008 |

(Continued)

OTHER PUBLICATIONS

Indian Office Action for IN Application No. 202217043589, mailed on Feb. 13, 2023 with English Translation.

(Continued)

*Primary Examiner* — Rowina J Cattungal
(74) *Attorney, Agent, or Firm* — Sughrue Mion, PLLC

(57) ABSTRACT

A surveillance apparatus (100) includes a feature value storage apparatus (200) that associates and stores a feature value of a person belonging to the same group, a detection unit (102) that detects an approach of a person not belonging to the same group to the person belonging to the same group within a reference distance by processing a captured image by using the feature value, and an output unit (104) that performs a predetermined output by using a detection result of the detection unit (102).

20 Claims, 21 Drawing Sheets

(56) References Cited

U.S. PATENT DOCUMENTS

2014/0313301 A1* 10/2014 Wakai ................... H04N 7/18
　　　　　　　　　　　　　　　　　　　　　348/77
2015/0010213 A1* 1/2015 Lin ................ G08B 13/19602
　　　　　　　　　　　　　　　　　　　　　382/106

FOREIGN PATENT DOCUMENTS

| JP | 2009-134488 A | 6/2009 |
| JP | 2014-197405 A | 10/2014 |
| JP | 2015-203881 A | 11/2015 |
| JP | 2018-067093 A | 4/2018 |
| JP | 2018-067295 A | 4/2018 |
| JP | 2018-125587 A | 8/2018 |
| JP | 2019-149641 A | 9/2019 |
| JP | 2020-017155 A | 1/2020 |
| WO | 2014/171061 A1 | 10/2014 |
| WO | 2016/088401 A1 | 6/2016 |

OTHER PUBLICATIONS

International Search Report for PCT Application No. PCT/JP2020/003213, mailed on Mar. 10, 2020.

\* cited by examiner

SURVEILLANCE SYSTEM, SURVEILLANCE APPARATUS, SURVEILLANCE METHOD, AND NON-TRANSITORYCOMPUTER-READABLE STORAGE MEDIUM

This application is a National Stage Entry of PCT/JP2020/003213 filed on Jan. 29, 2020, the contents of all of which are incorporated herein by reference, in their entirety.

TECHNICAL FIELD

The present invention relates to a surveillance system, a surveillance apparatus, a surveillance method, and a program.

BACKGROUND ART

In recent years, a surveillance camera is installed at various places. In this way, suppression of danger is achieved. For example, Patent Document 1 describes a system for surveying a scene of a plant. The system detects a position of a worker by using image information of a surveillance camera at a scene of a plant where an electric wave of a global positioning system (GPS) is not reached, and surveys whether the worker enters a dangerous region.

RELATED DOCUMENT

Patent Document

[Patent Document 1] Japanese Patent Application Publication No. 2009-134488

SUMMARY OF THE INVENTION

Technical Problem

When a person is harmed by another person, the another person is often a stranger to a victim. Particularly when a person moves out of a living area, there is a possibility that harm may be caused by another strange person. Further, even in a living area, there is a possibility that harm may be caused by a stalker or the like approaching without being noticed by a person.

The present invention has been made in view of the circumstance described above, and an object thereof is to reduce a risk that a person is harmed by another person.

Solution to Problem

In each aspect according to the present invention, each configuration below is adopted in order to solve the above-mentioned problem.

A first aspect relates to a surveillance system.

The surveillance system according to the first aspect includes:

at least one camera that captures a person located at a place being a watched target;
an image processing apparatus; and
a surveillance apparatus, wherein
the surveillance apparatus includes
a feature value storage unit that associates and stores a feature value of a person being a watched target,
a detection unit that detects an approach of a person not being the watched target to the person being the watched target within a reference distance by causing the image processing apparatus to process a captured image of the camera by using the feature value, and
an output unit that performs a predetermined output by using a detection result of the detection unit.

A second aspect relates to a surveillance apparatus.

The surveillance apparatus according to the second aspect includes:

a feature value storage unit that stores a feature value of a person being a watched target;
a detection unit that detects an approach of a person not being the watched target to the person being the watched target within a reference distance by processing a captured image by using the feature value; and
an output unit that performs a predetermined output by using a detection result of the detection unit.

A third aspect relates to a surveillance method executed by at least one computer.

The surveillance method according to the third aspect includes:

by a surveillance apparatus,
associating and storing a feature value of a person being a watched target in a feature value storage unit;
detecting an approach of a person not being the watched target to the person being the watched target within a reference distance by processing a captured image by using the feature value; and
performing a predetermined output by using the detected result.

Note that, another aspect according to the present invention may be a program causing at least one computer to execute the method in the third aspect described above, or may be a computer-readable storage medium that stores such a program. The storage medium includes a non-transitory tangible medium.

The computer program includes a computer program code causing a computer to execute the surveillance method on the surveillance apparatus when the computer program code is executed by the computer.

Note that, any combination of the components above and expression of the present invention being converted among a method, an apparatus, a system, a storage medium, a computer program, and the like are also effective as a manner of the present invention.

Further, various components according to the present invention do not necessarily need to be an individually independent presence, and a plurality of components may be formed as one member, one component may be formed of a plurality of members, a certain component may be a part of another component, a part of a certain component and a part of another component may overlap each other, and the like.

Further, a plurality of procedures are described in an order in the method and the computer program according to the present invention, but the described order does not limit an order in which the plurality of procedures are executed. Thus, when the method and the computer program according to the present invention are executed, an order of the plurality of procedures can be changed within an extent that there is no harm.

Furthermore, a plurality of procedures of the method and the computer program according to the present invention are not limited to being executed at individually different timings. Thus, another procedure may occur during execution of a certain procedure, an execution timing of a certain procedure and an execution timing of another procedure may partially or entirely overlap each other, and the like.

Advantageous Effects of Invention

According to each of the aspects described above, a risk that a person is harmed by another person can be reduced.

DESCRIPTION OF EMBODIMENTS

Hereinafter, example embodiments of the present invention will be described with reference to the drawings. Note that, in all of the drawings, a similar component has a similar reference sign, and description thereof will be appropriately omitted.

"Acquisition" in an example embodiment includes at least one of acquisition (active acquisition), by its own apparatus, of data or information being stored in another apparatus or a storage medium, and inputting (passive acquisition) of data or information output from another apparatus to its own apparatus. Examples of the active acquisition include reception of a reply by making a request or an inquiry to another apparatus, reading by accessing another apparatus or a storage medium, and the like. Further, examples of the passive acquisition include reception of information to be distributed (transmitted, push-notified, or the like), and the like. Furthermore, "acquisition" may include acquisition by selection from among pieces of received data or pieces of received information, or reception by selecting distributed data or distributed information.

First Example Embodiment

<System Outline>

Figure 1:
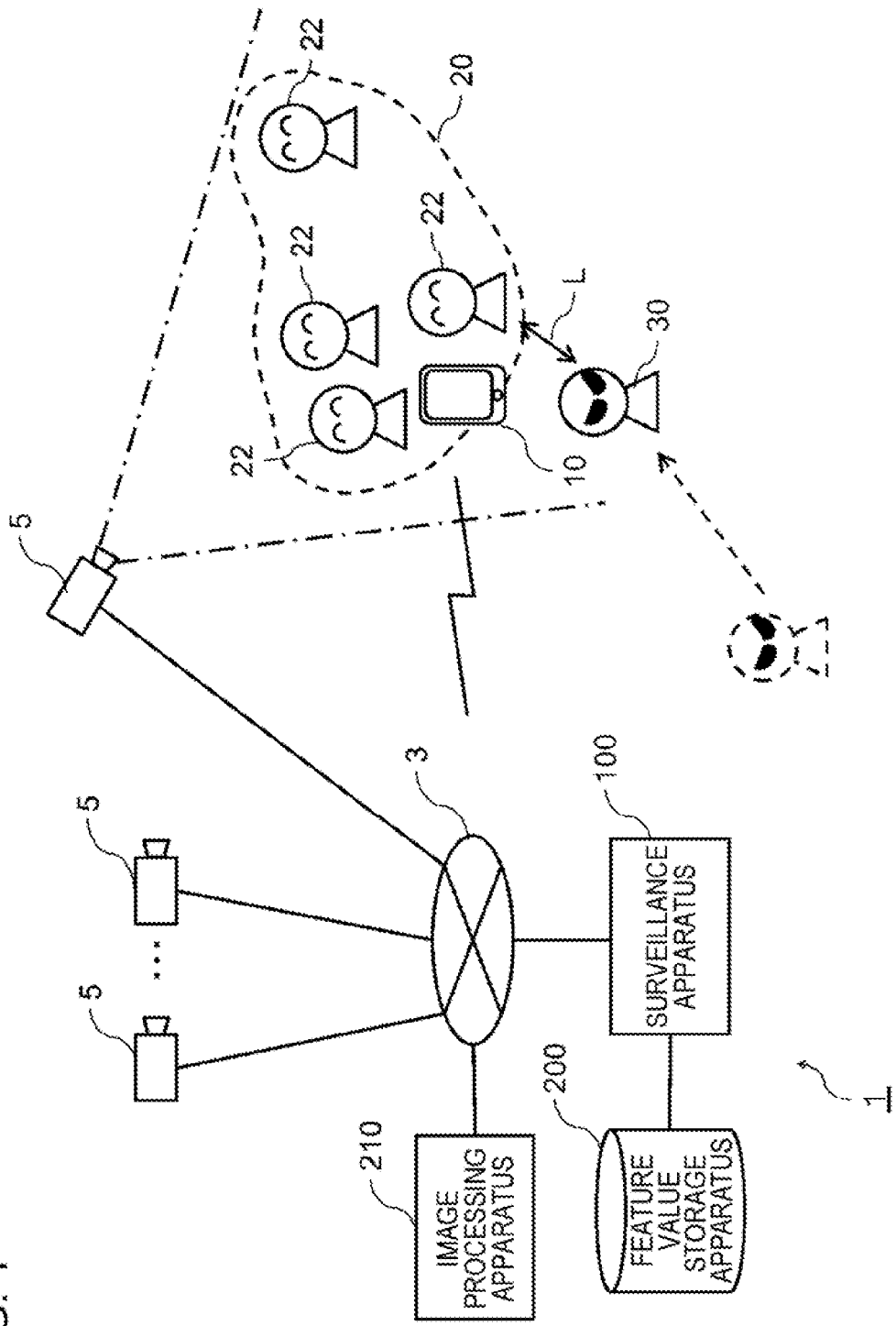
FIG. 1 is a diagram schematically illustrating an outline of a surveillance system according to an example embodiment.

FIG. 1 is a diagram schematically illustrating an outline of a surveillance system 1 according to an example embodiment. The surveillance system 1 processes an image captured by a surveillance camera 5 installed in a town, and, when a person 30 not belonging to a previously registered group 20 approaches a person 22 belonging to the group 20, the surveillance system 1 informs a user terminal 10 of the person 22 of the group 20 about the approach. Alternatively, a supervisor at a surveillance center keeps watch on the group 20 and a state of a town. However, the person 22 being a watched target may not belong to the group 20, and may be an individual. In this case, a person other than a person being a watched target surveys an approach to a watched target person.

A capturing place being a watched target is a passage, a street such as a road, an open space, and the like, and may include the inside of a facility. The capturing place is, for example, a place where an unspecified large number of people gather. In other words, the surveillance system 1 notifies the person 22 of the group 20 that the person 30 (strange person) not belonging to the group 20 is approaching, and calls attention, and a supervisor also keeps watch on a surveillance center side, and thus a risk that a user faces a crime can be reduced, and public safety of a town can be made better.

Furthermore, as described in an example embodiment described below, the capturing place may be a specified place. For example, an approach of a person such as a stalker without being noticed by a person being a watched target may be detected. In other words, a place including an area around a station, a commuting road to work or school, a shopping center, an area around a house, and the like that are used by a person being a watched target may be specified as the capturing place.

The surveillance system 1 includes a surveillance apparatus 100, a feature value storage apparatus 200, an image processing apparatus 210, the user terminal 10, and at least one surveillance camera 5. The surveillance camera 5 may be specialized in the surveillance system 1, or, for example, the surveillance camera 5 that has been installed since before may be used.

The surveillance camera 5 includes a lens and a capturing element such as a charge coupled device (CCD) image sensor. The surveillance camera 5 may include a mechanism for performing control of an orientation of a camera main body and a lens, zooming control, focusing control, and the like by following a movement of a person present at an angle of view.

An image generated by the surveillance camera 5 is preferably captured in real time and transmitted to the surveillance apparatus 100. However, an image transmitted to the surveillance apparatus 100 may not be directly transmitted from the surveillance camera 5, and may be an image delayed by a predetermined time. An image captured by the surveillance camera 5 may be once stored in another storage apparatus, and may be read by the surveillance apparatus 100 from the storage apparatus successively or by each predetermined interval. Furthermore, an image transmitted to the surveillance apparatus 100 is preferably a moving image, but may be a frame image by each predetermined interval or may be a still image.

A connection method between the surveillance camera 5 and the surveillance apparatus 100 may be a wireless manner or a wired manner. In a case of wireless connection, it is assumed that each of the surveillance camera 5 and the surveillance apparatus 100 has a wireless communication function. The surveillance camera 5 may be a network camera such as an Internet protocol (IP) camera, for example.

Functional Configuration Example

Figure 2:
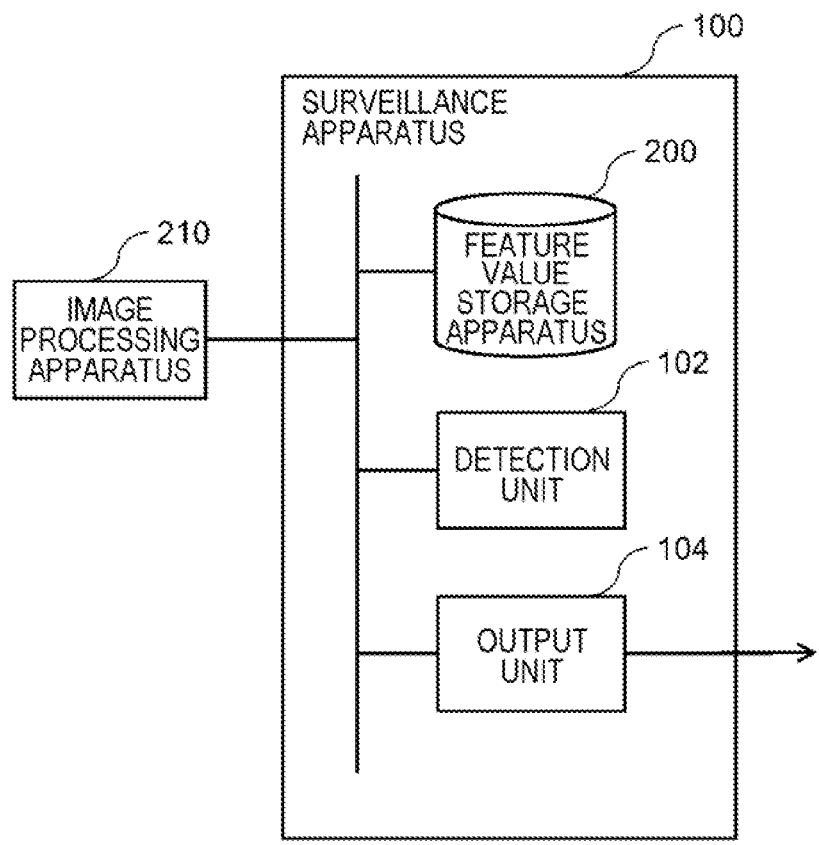
FIG. 2 is a functional block diagram illustrating a logical configuration example of a surveillance apparatus according to the example embodiment.

FIG. 2 is a functional block diagram illustrating a logical configuration example of the surveillance apparatus 100 in FIG. 1. The surveillance apparatus 100 includes a detection unit 102, an output unit 104, and the feature value storage apparatus 200. The feature value storage apparatus 200 associates and stores a feature value of a person being a watched target. The detection unit 102 detects an approach of the person 30 not being a watched target to the person 22 being a watched target within a reference distance by processing a captured image by using a feature value. In other words, the detection unit 102 distinguishes a person whose feature value is not stored in the feature value storage apparatus 200 as a person (the person 30 not being a watched target) other than the watched target. The output unit 104 performs a predetermined output by using a detection result of the detection unit 102.

The feature value storage apparatus 200 may associate and store feature values of persons belonging to the same group 20. Hereinafter, an example in which the feature values of the persons belonging to the same group 20 are associated and stored will be mainly described in the present example embodiment.

The feature value storage apparatus 200 may be an apparatus provided inside the surveillance apparatus 100, may be an apparatus different from the surveillance apparatus 100, or may be a combination thereof. The feature value storage apparatus 200 may be a plurality of storage apparatuses.

The group 20 is, for example, a group of tour members who act together, and the like. A user of the present surveillance system 1 performs user registration in advance, and also performs group registration. Each piece of registration information will be described later.

Hardware Configuration Example

Figure 3:
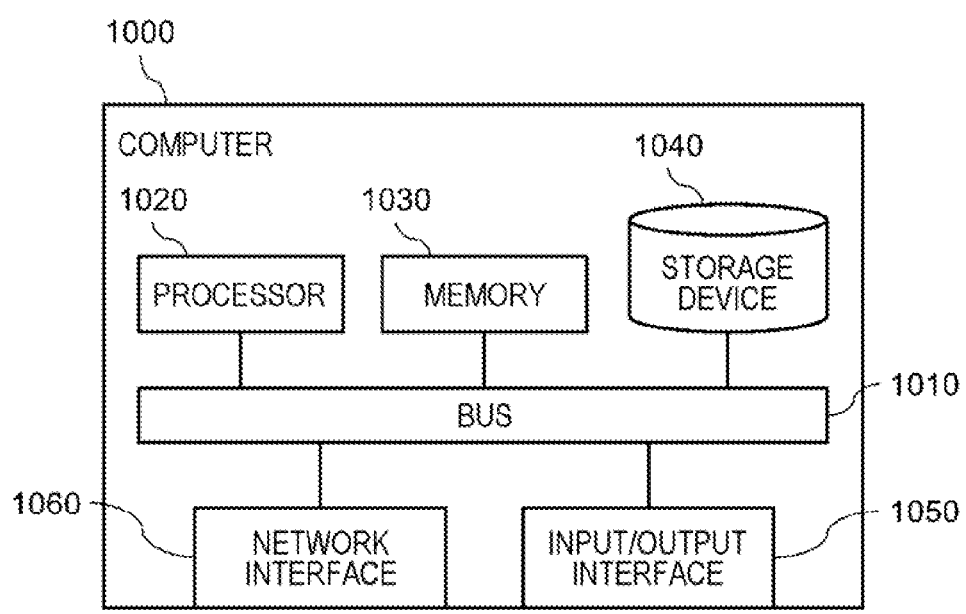
FIG. 3 is a block diagram illustrating a hardware configuration of a computer that achieves each apparatus of the surveillance system according to the example embodiment.

FIG. 3 is a block diagram illustrating a hardware configuration of a computer 1000 that achieves each of the surveillance apparatus 100, the image processing apparatus 210, and the user terminal 10 of the surveillance system 1 illustrated in FIG. 1.

The computer 1000 includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data with one another. However, a method of connecting the processor 1020 and the like to each other is not limited to bus connection.

The processor 1020 is a processor achieved by a central processing unit (CPU), a graphics processing unit (GPU), and the like.

The memory 1030 is a main storage apparatus achieved by a random access memory (RAM) and the like.

The storage device 1040 is an auxiliary storage apparatus achieved by a hard disk drive (HDD), a solid state drive (SSD), a memory card, a read only memory (ROM), or the like. The storage device 1040 stores a program module that achieves each function (for example, the detection unit 102 and the output unit 104, and a decision unit 106, a positional information acquisition unit 108, a reception unit 110, and a registration unit 112 that will be described below, and the like) of the surveillance apparatus 100 of the surveillance system 1. The processor 1020 reads each program module onto the memory 1030 and executes the program module, and each function associated with the program module is achieved. Further, the storage device 1040 also functions as a storage unit that stores various pieces of information used by the surveillance apparatus 100. In a case of a configuration including the feature value storage apparatus 200 inside the surveillance apparatus 100, the storage device 1040 also functions as the feature value storage apparatus 200.

The program module may be stored in a storage medium. The storage medium that stores the program module may include a non-transitory tangible medium usable by the computer 1000, and a program code readable by the computer 1000 (the processor 1020) may be embedded in the medium.

The input/output interface 1050 is an interface for connecting the computer 1000 and various types of input/output equipment.

The network interface 1060 is an interface for connecting the computer 1000 to a communication network 3. The communication network 3 is, for example, a local area network (LAN) and a wide area network (WAN). A method of connection to the communication network 3 by the network interface 1060 may be wireless connection or wired connection. However, the network interface 1060 may not be used.

Then, the computer 1000 is connected to necessary equipment (for example, the surveillance camera 5, a display (not illustrated), a speaker (not illustrated), and the like) via the input/output interface 1050 or the network interface 1060.

Since the surveillance system 1 is achieved by a combination of the surveillance apparatus 100, the user terminal 10, and the image processing apparatus 210, the surveillance system 1 is achieved by a plurality of the computers 1000 constituting each of the components. The surveillance apparatus 100 is, for example, a server computer. The user terminal 10 is, for example, a smartphone, a tablet terminal, and the like. The image processing apparatus 210 may be an apparatus different from the surveillance apparatus 100, may be an apparatus included inside the surveillance apparatus 100, or may be a combination thereof.

Each component of the surveillance apparatus 100 according to the present example embodiment in FIG. 2 is achieved by any combination of hardware of the computer 1000 in FIG. 3 and software. Then, various modification examples of an achievement method and an apparatus thereof are understood by a person skilled in the art. A functional block diagram illustrating the surveillance apparatus 100 according to each example embodiment illustrates a block of logical functional units instead of a configuration of hardware units.

A plurality of system configuration examples that achieve the surveillance apparatus 100 are conceivable and exemplified below, which are not limited thereto.

As one example, an application program for using a service provided by the surveillance system 1 is installed and activated in the user terminal 10. By operating the application on the user terminal 10 and also accessing a server computer of the surveillance apparatus 100 from the user terminal 10, a user can use a service of the surveillance system 1. Note that, a user performs registration for use of a service of the present system in advance, registers user information, acquires authentication information (a user ID and a password), and can thus use the surveillance system 1.

In this example, each function (for example, the detection unit 102 and the output unit 104) of the surveillance apparatus 100 illustrated in FIG. 2 and the like can also be achieved by being shared between the user terminal 10 and the surveillance apparatus 100 (server apparatus). However, in the present example embodiment, the user terminal 10 achieves a user interface function of the surveillance apparatus 100, and the surveillance apparatus 100 (server apparatus) achieves a main function (for example, the detection unit 102 and the output unit 104).

In another example, in the user terminal 10, a predetermined browser is activated, and a Web page providing a service of the surveillance system 1 is accessed through the communication network 3 such as the Internet.

A user performs registration for use of a service of the present system in advance, registers user information, acquires authentication information (a user ID and a password), and can thus use the surveillance system 1. The surveillance apparatus 100 outputs a surveillance situation of a user to a user-specific Web page, and provides information.

In still another example, the computer 1000 may be a server apparatus of a system such as software as a service (SaaS) providing a service of the surveillance apparatus 100. The user terminal 10 may access a server through the communication network 3 such as the Internet, and the surveillance apparatus 100 may be achieved by a program operating on the server.

Operation Example

Figure 4:
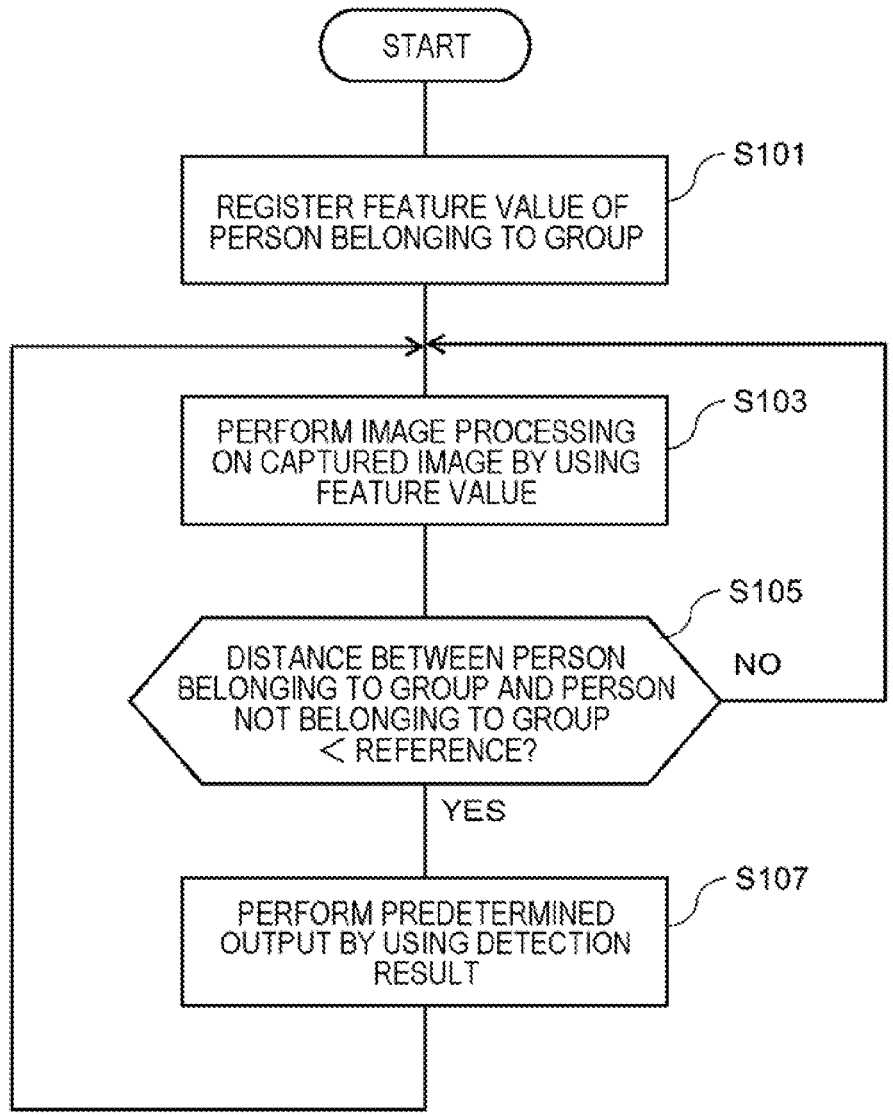
FIG. 4 is a flowchart illustrating an operation example of the surveillance apparatus according to the example embodiment.
Figure 5A:
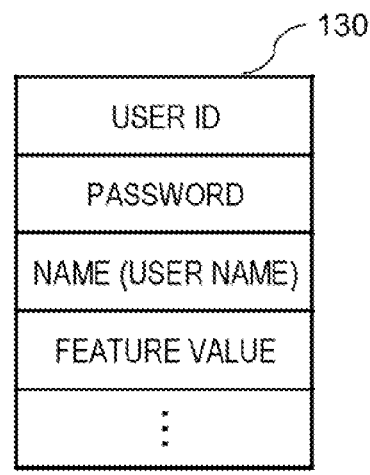
FIGS. 5A and 5B are diagrams each illustrating a data structure example of registration information.
Figure 5B:
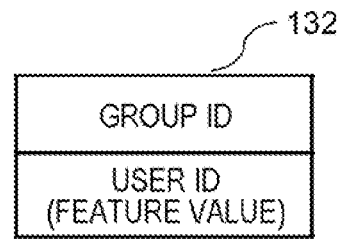

FIG. 4 is a flowchart illustrating an operation example of the surveillance apparatus 100 according to the present example embodiment. First, the feature value storage apparatus 200 associates and stores feature values of persons being watched targets and belonging to the same group (step S101). FIG. 5A is a diagram illustrating one example of a data structure of user registration information 130. In the user registration information 130, at least identification information (user ID) that identifies a user and a feature value are associated and stored, and a name (or a user name) of the user and a password may be associated. FIG. 5B is a diagram illustrating one example of a data structure of group registration information 132. In the group registration information 132, identification information (group ID) of the group 20 and user IDs of at least two members of the group 20 are associated. Alternatively, in the group registration information 132, feature values of at least two members of the group 20 may be associated and stored. The user registration information 130 and the group registration information 132 in FIG. 5 are stored in the feature value storage apparatus 200.

In the present example embodiment, a feature value is a feature value of a face. As another example, a feature value may be at least any one of feature values such as an iris, a vein, an auricle, a fingerprint, a gait, and a stature (such as a height, a shoulder width, a body length, and a bone structure), for example. In the present example embodiment, a feature value of a face extracted from a captured image in which a face of a user is captured at a time of registration is associated in the feature value storage apparatus 200.

The processing in step S101 is performed as a preparation before surveillance starts. Subsequently, this processing does not have to be performed until it becomes necessary to newly register a feature value of a watched target person or delete the feature value of the watched target person being already registered. The normal processing may be performed after step S101. The processing after step S101 starts after a user activates the application, when a start instruction of surveillance is received from a user, and the like, for example.

Referring back to FIG. 4, the detection unit 102 causes the image processing apparatus 210 to process a captured image acquired from the surveillance camera 5 by using a feature value (a feature value in the user registration information 130 or the group registration information 132) of the feature value storage apparatus 200 (step S103). Then, the detection unit 102 detects an approach of the person 30 not belonging to the same group 20 to the person 22 belonging to the same group 20 within a reference distance (step S105).

Then, when the detection unit 102 detects an approach of the person 30 not belonging to the same group 20 to the person 22 belonging to the same group 20 within a reference distance (YES in step S105), the output unit 104 performs a predetermined output (step S107). On the other hand, when the person 30 not belonging to the same group 20 is not approaching the person 22 belonging to the same group 20 within the reference distance (NO in step S105), the processing returns to step S103, and watching continues. For example, the present processing ends by receiving an instruction for ending the application by a user.

For example, the predetermined output is to output, to the user terminal 10, information indicating an approach to the person 22 belonging to the same group 20 within a reference distance. Furthermore, the predetermined output may be to output information to a display (not illustrated) of the surveillance apparatus 100.

Various methods of detecting an approach of the person 30 not belonging to the same group 20 by the detection unit 102 in step S103 and step S105 described above in FIG. 4 are conceivable and exemplified by the following first and second methods, which are not limited thereto.

Figure 6:
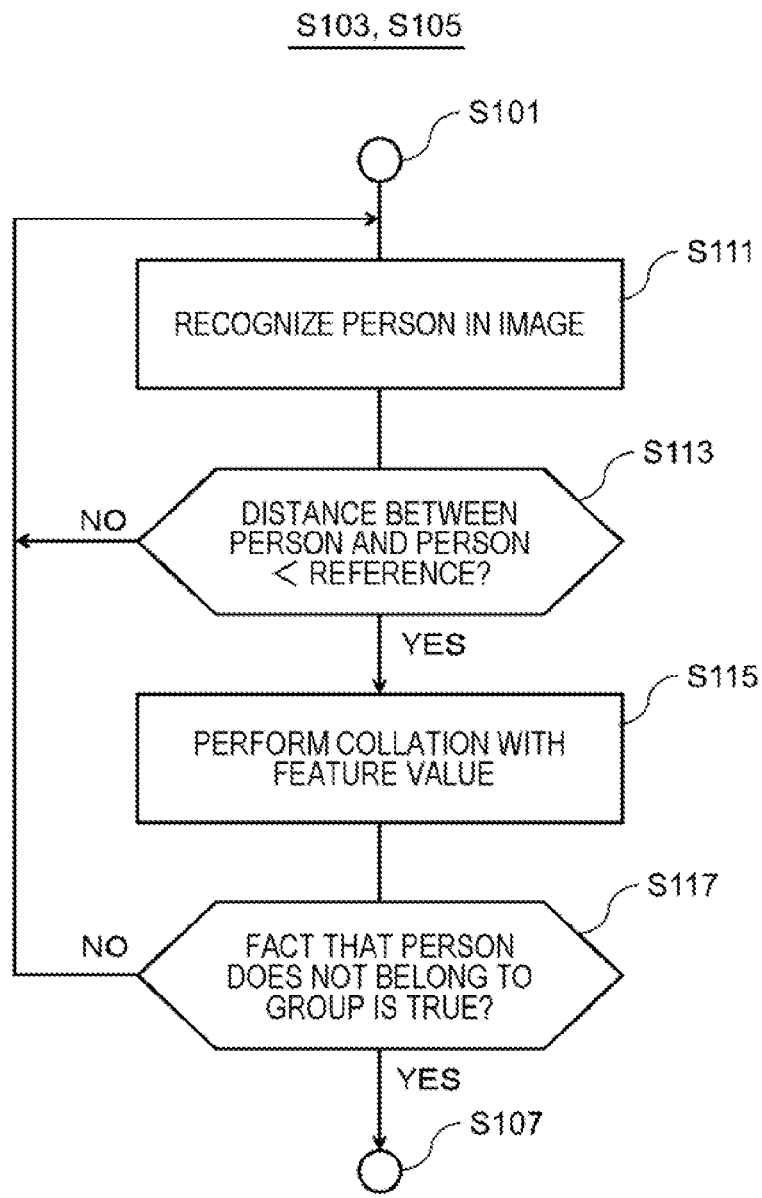
FIG. 6 is a diagram schematically illustrating a configuration example of the surveillance system according to the example embodiment.

In the first method illustrated in FIG. 6, after step S101 in FIG. 4, for example, when an instruction for starting watching by a user is received, the present processing starts. First, the detection unit 102 causes the image processing apparatus 210 to recognize all persons captured in an image acquired from the surveillance camera 5 (step S111).

Then, the detection unit 102 measures a distance to another adjacent person for each person in the image, and decides whether the distance is less than a reference distance (step S113). A conversion coefficient (ratio) for converting a distance in an image in each capturing range into an actual distance is registered in advance for each surveillance camera 5. The detection unit 102 converts a distance in an image into an actual distance by using the conversion coefficient, and compares the actual distance with a reference distance. Alternatively, the detection unit 102 converts a reference distance into a scale of a distance in an image by using the conversion coefficient, and compares the distance in the image with a distance in a capturing range.

The reference distance is registered in advance. The reference distance may be able to be set by a user. The reference distance may be able to be set by a numerical value, or may be able to be set by an index (for example, short/standard/long, and the like) other than a numerical value. Further, the reference distance may be able to be set by a level of public safety. In a place with poor public safety, the reference distance may be at a setting level longer than that in another place, and, in a place with good public safety, the reference distance may be at a setting level shorter than that in another place. The reference distance may be able to be specified by a user operation by using a graphical user interface (GUI) such as a slider on an operation screen on the user terminal 10.

Then, when a distance between a person and a person is less than the reference (YES in step S113), the detection unit 102 extracts each feature value of a facial portion of the two persons. Then, the detection unit 102 causes the image processing apparatus 210 to perform collation with a feature value of a face image registered in the feature value storage apparatus 200 (step S115). As a result of the collation, when a feature value having a similarity degree equal to or more than a threshold value is registered in the feature value storage apparatus 200, the detection unit 102 determines that the person belongs to the group 20 (NO in step S117). Then, the processing returns to step S111, and watching continues. On the other hand, when a distance between a person and a person is equal to or more than the reference (NO in step S113), the processing returns to step S111, and watching continues.

On the other hand, as a result of the collation, when a feature value having a similarity degree equal to or more than the threshold value is not registered in the feature value storage apparatus 200, the detection unit 102 determines that the person does not belong to the group 20 (YES in step S117). Then, the processing proceeds to step S107 in FIG. 4, and the output unit 104 performs a predetermined output.

Figure 7:
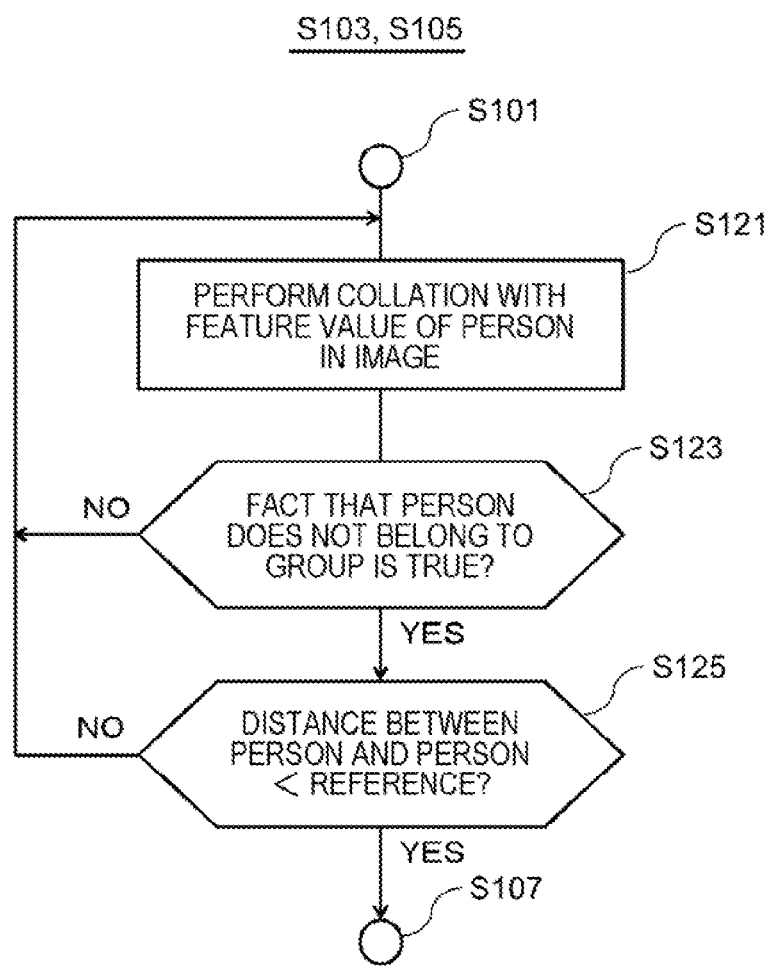
FIG. 7 is a functional block diagram illustrating a logical configuration example of the surveillance apparatus according to the example embodiment.

In the second method illustrated in FIG. 7, after step S101 in FIG. 4, for example, when an instruction for starting watching by a user is received, the present processing starts. First, the detection unit 102 extracts each feature value of a face of each person captured in an image acquired from the surveillance camera 5, and causes the image processing apparatus 210 to perform collation with a feature value stored in the feature value storage apparatus 200 (step S121). As a result of the collation, when a feature value having a similarity degree equal to or more than a threshold value is registered in the feature value storage apparatus 200, the detection unit 102 determines that the person belongs to the group 20 (NO in step S123). In this case, the processing returns to step S121, and watching continues. On the other hand, as a result of the collation, when a feature value having a similarity degree equal to or more than the threshold value is not registered in the feature value storage apparatus 200, the detection unit 102 determines that the person does not belong to the group 20 (YES in step S123). In this case, the processing proceeds to step S125.

Furthermore, the detection unit 102 decides whether a distance between a person determined not to belong to the group 20 and the person 22 of the group 20 closest to the person is shorter than a reference distance (step S125). A conversion method of a distance may be the same as the method in FIG. 6. Then, when the distance is less than the reference (YES in step S125), the processing proceeds to step S107 in FIG. 4, and the output unit 104 performs a predetermined output. When the distance is equal to or more than the reference, that is, a distance between the person 30 not belonging to the group 20 and the person 22 belonging to the group 20 is less than the reference (NO in step S125), the processing returns to step S121, and watching continues.

Figure 8:
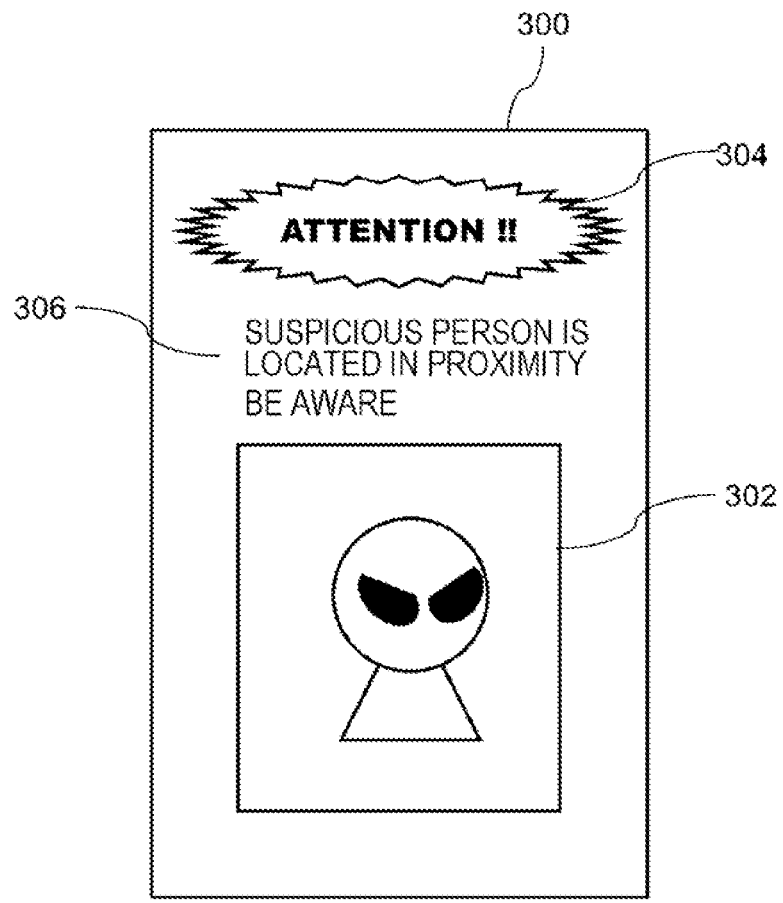
FIG. 8 is a diagram illustrating one example of a suspicious person notification screen.

FIG. 8 is a diagram illustrating one example of a suspicious person notification screen 300 being displayed on a display (not illustrated) of the user terminal 10 by the output unit 104. The suspicious person notification screen 300 includes a person image display portion 302, an icon display portion 304, and a message display portion 306. In the person image display portion 302, an image acquired by cutting, from a captured image acquired from the surveillance camera 5, a region including a face of the person 30 is displayed. In the icon display portion 304, an image calling attention of a user is displayed. This image may be emphasized by animation and the like. In the message display portion 306, a message informing a user that the person 30 not belonging to the group 20 is approaching is displayed.

A message informing a user that a suspicious person is approaching by sound other than display of the suspicious person notification screen 300 may be output from a speaker (not illustrated) to the user terminal 10. Before the suspicious person notification screen 300 is displayed on the user terminal 10 or sound is output to the user terminal 10, at least any one of mark display of an icon of an application, an output of a notification to a standby screen, blinking/lighting display of a light emitting diode (LED), and a vibration may be combined with respect to the user terminal 10. A user may be able to select which output method is performed.

Alternatively, a destination such as a mail address and a cellular phone number of a user or a person other than a user may be registered in advance as a notification destination, and a notification may be made by transmitting a mail to the notification destination. In the mail, an image acquired by cutting, from a captured image acquired from the surveillance camera 5, a region including a face of the person 30 may be attached, and information such as an alert occurrence date and time, a place, a group name, and a group registrant may be included.

For display on the display of the surveillance apparatus 100, at least information about the group 20 being the notification target and an image of a suspicious person are displayed. Furthermore, information about a place where a suspicious person is approaching from positional information about the surveillance camera 5 that generates an image used for collation may also be displayed.

According to the present example embodiment, the detection unit 102 can detect an approach of a person other than a watched target to a person being a watched target within a reference distance by processing a captured image, and the output unit 104 can output the detection result. Particularly, by associating and storing a person belonging to the same group 20 in the feature value storage apparatus 200, an approach of a person other than a person in the group 20 can be notified to the group 20. In other words, by processing an image captured by the surveillance camera 5, a person being a watched target and a person not being a watched target, or a person belonging to the group 20 and a person not belonging to the group 20 can be distinguished, an approach of another person to a person being a watched target or the group 20 can be detected, and the watched target person can be notified. Thus, according to the present example embodiment, a risk that harm is caused by another strange person or a person approaching without being noticed can be reduced.

Second Example Embodiment

Functional Configuration Example

A surveillance system 1 according to the present example embodiment is similar to the example embodiment described above other than a point that the surveillance system 1 according to the present example embodiment has a configuration for performing a predetermined output when a person 30 (not a watched target) not belonging to a group 20 continues to be located in proximity to a person 22 (being a watched target) belonging to the group 20 for equal to or longer than a predetermined period of time. Since a surveillance apparatus 100 according to the present example embodiment has the same component as that in the first example embodiment, description is given by using FIG. 2. However, the present example embodiment can be combined as long as the present example embodiment is not inconsistent with at least any one of configurations in example embodiments described below.

Operation Example

Figure 9:
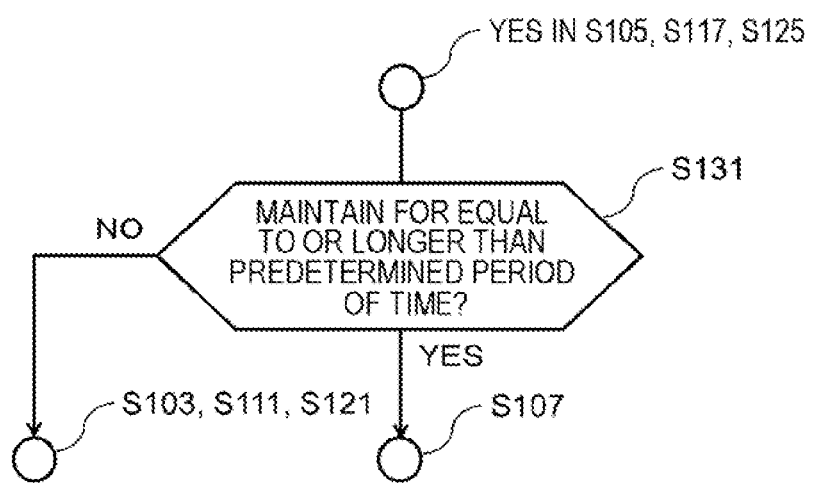
FIG. 9 is a flowchart illustrating one example of an operation of a surveillance apparatus according to an example embodiment.

FIG. 9 is a flowchart illustrating one example of an operation of the surveillance apparatus 100. First, a flow in FIG. 9 starts after YES is made in each decision of any of step S105 in FIG. 4, step S117 in FIG. 6, and step S125 in FIG. 7. When a state where the person 30 not belonging to the same group 20 approaches the person 22 belonging to the same group 20 within a reference distance is maintained for equal to or longer than a reference period of time (YES in step S131), an output unit 104 performs a predetermined output (step S107 in FIG. 4). When the state is not maintained for equal to or longer than the reference period of time (NO in step S131), the processing returns to any of step S103 in FIG. 4, step S111 in FIG. 6, and step S121 in FIG. 7, and watching continues.

The predetermined period of time may be able to be changed by a user operation. The predetermined output by the output unit 104 in step S107 is similar to that in the first example embodiment described above.

According to the present example embodiment, since a predetermined output is not performed when the person 30 not being a watched target is not approaching the person 22 being a watched target for equal to or longer than a predetermined period of time, the person 30 being temporarily located in proximity can be prevented from being detected as a suspicious person. According to the present example embodiment, an effect similar to that in the example embodiment described above can be achieved, and, furthermore, accuracy of detection of an approach of a suspicious person can be further increased. In other words, a frequent notification about an approach of a suspicious person can be suppressed, and a truly dangerous state can be notified, and thus a decrease in a sense of crises of a user due to a frequent notification can be prevented.

Third Example Embodiment

A surveillance system 1 according to the present example embodiment is similar to that in the example embodiments described above other than a point that the surveillance system 1 according to the present example embodiment has a configuration for deciding whether a person approaching a watched target person is included in a predetermined list.

Functional Configuration Example

Figure 10:
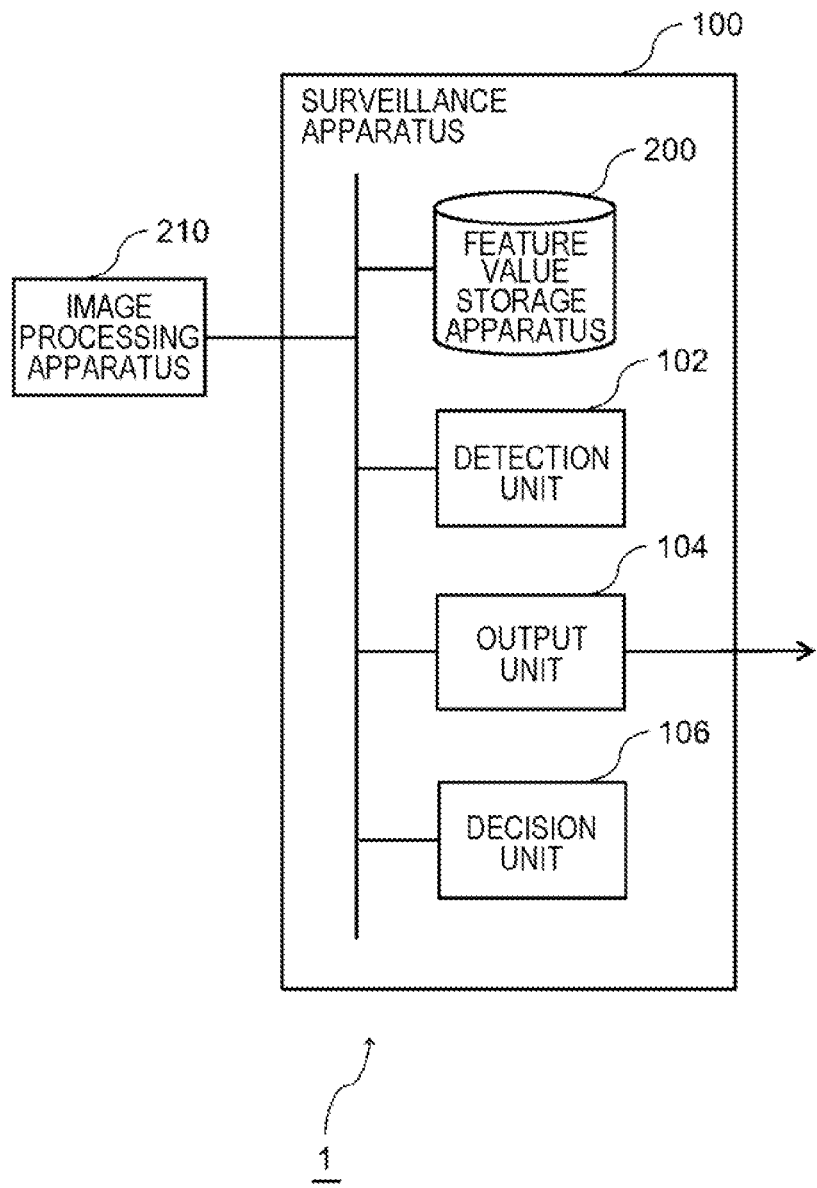
FIG. 10 is a functional block diagram illustrating a logical configuration example of a surveillance system according to an example embodiment.

FIG. 10 is a functional block diagram illustrating a logical configuration example of the surveillance system 1. The surveillance system 1 includes a feature value storage apparatus 200, a detection unit 102, and an output unit 104 that are the same as those of the surveillance apparatus 100 according to the example embodiment in FIG. 2, and further includes a decision unit 106. In the example according to the present example embodiment in FIG. 10, an example combined with the configuration according to the first example embodiment in FIG. 2 is exemplified, but the present example embodiment may be combined as long as the present example embodiment is not inconsistent with at least any one of configurations in the other example embodiments.

Figure 11A:
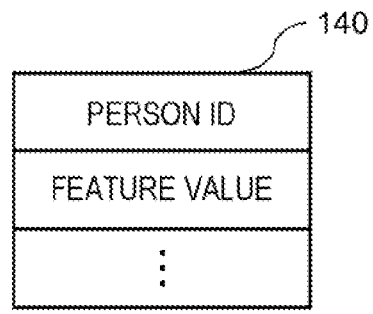
FIGS. 11A, 11B and 11C are diagrams each illustrating one example of a data structure of a predetermined list.

The decision unit 106 decides whether a person approaching the same group 20 within a reference distance is included in a predetermined list (a group-specific person list 142 or an individual-specific person list 144). FIG. 11 is a diagram illustrating one example of a data structure of a predetermined list according to the present example embodiment. FIG. 11A is specific person information 140. The specific person information 140 includes identification information (person ID) about a specific person and a feature value in association with each other.

The predetermined list can be created by group or individual. In the predetermined list, for example, a person being more likely to be involved in a crime and the like, such as a wanted person, a person involved in an antisocial act, a person with a criminal record, and a stalker, for example, may be registered.

Figure 11B:
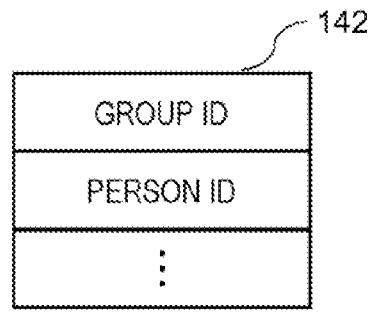
Figure 11C:
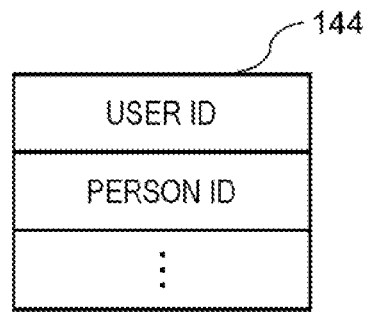

FIG. 11B is a diagram illustrating one example of a data structure of the group-specific person list 142. FIG. 11C is a diagram illustrating one example of a data structure of the individual-specific person list 144.

The group-specific person list 142 stores a person ID of a person being a surveillance target in association with identification information (group ID) about the group 20. The individual-specific person list 144 stores a person ID of a person being a surveillance target in association with identification information (user ID) about a user. In the individual-specific person list 144, a person desired to be personally particularly surveyed, such as a stalker, for example, can be specified.

The lists may be able to be set by a user operation from a user terminal 10 of a user. The plurality of lists may be able to be selected, or at least one of a period, a date and time, and a district for making a list valid may be able to be specified. In this configuration, when a condition (such as a period, a date and time, and a district) where a specified list is made valid is satisfied, the decision unit 106 makes a decision by using the list.

Operation Example

Figure 12:
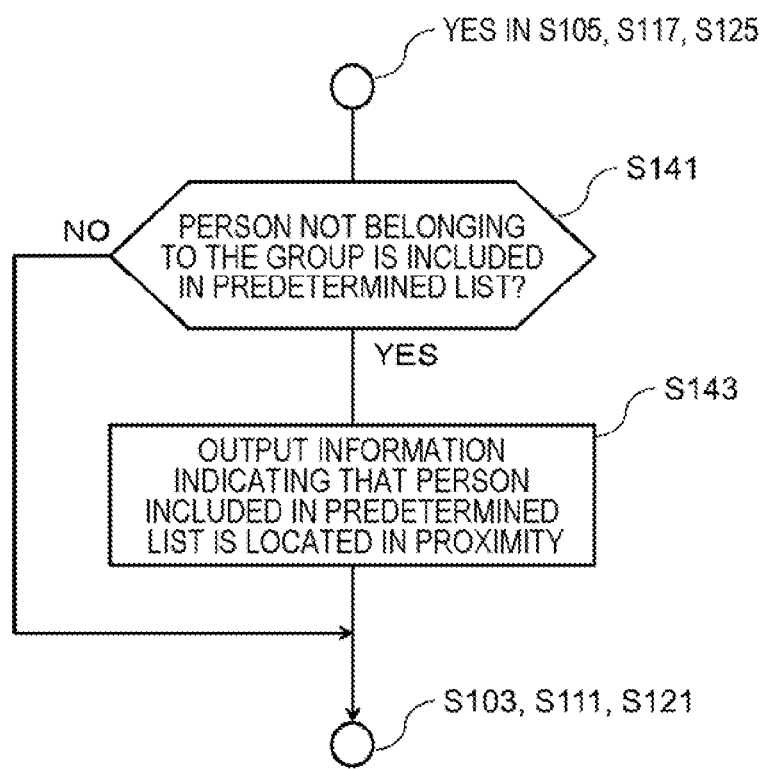
FIG. 12 is a flowchart illustrating an operation example of the surveillance system according to the example embodiment.

FIG. 12 is a flowchart illustrating an operation example of the surveillance system 1. A flow in FIG. 12 starts after YES is made in each decision of any of step S105 in FIG. 4, step S117 in FIG. 6, and step S125 in FIG. 7. The decision unit 106 decides whether a person 30 who is approaching the group 20 being a watched target within a reference distance and is not a watched target is included in a predetermined list (step S141). When it is decided that the person 30 approaching the group 20 being a watched target within the reference distance is included in the predetermined list (YES in step S141), the output unit 104 further outputs information indicating the approach (step S143).

Figure 13:
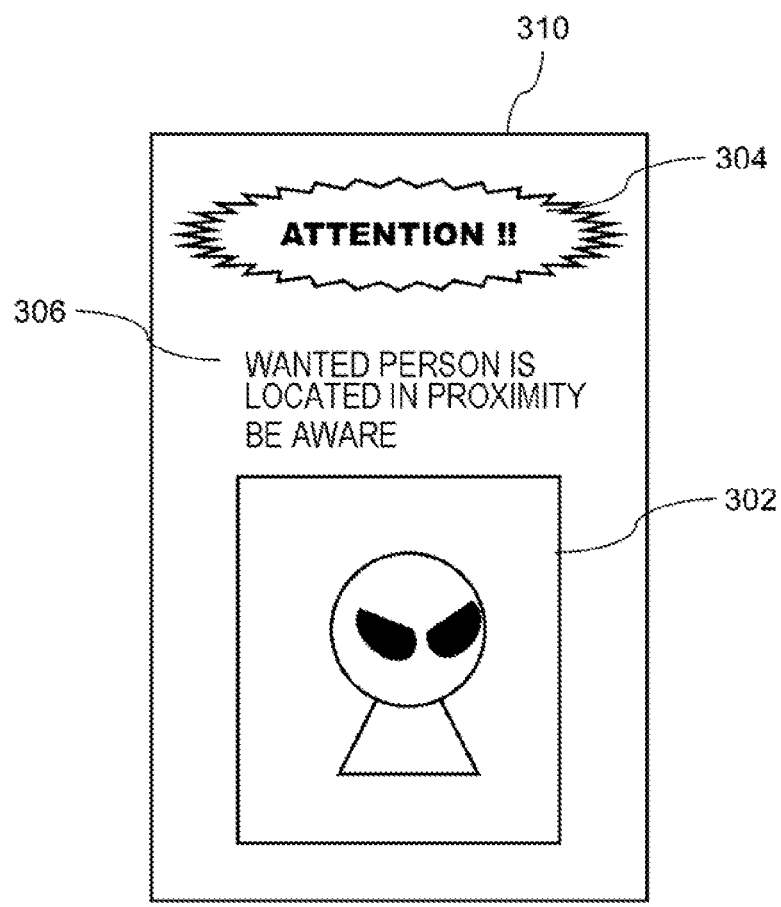
FIG. 13 is a diagram illustrating one example of a warning screen.

FIG. 13 is a diagram illustrating one example of a warning screen 310 being displayed on a display of the user terminal 10. The warning screen 310 includes a person image display portion 302, an icon display portion 304, and a message display portion 306 that are the same as those in the suspicious person notification screen 300 in FIG. 8, but a message in the message display portion 306 is different. In the example in FIG. 13, a message informing a user that a person included in a predetermined list is approaching the group 20 and calling attention is displayed in the message display portion 306. FIG. 13 illustrates an example (such as "wanted person is located in proximity. Be aware.") of a message when a predetermined list is a list of wanted persons.

A message displayed by category can be switched by specifying a category of a predetermined list for each list. As the category, for example, a wanted person, a terrorist, a gangster, a person with a criminal record, a stalker, and the like are conceivable, which are not limited thereto. The category may be configured to be specified in advance by an application and be able to be selected, or may be configured to be able to be newly input by a user. When a new category is added, a message to be displayed may be able to be set by selection or input.

Referring back to FIG. 12, after step S143, the processing returns to any of step S103 in FIG. 4, step S111 in FIG. 6, and step S121 in FIG. 7, and watching continues. On the other hand, when it is determined that the person 30 approaching the group 20 being a watched target within the reference distance is not included in the predetermined list (NO in step S141), the processing bypasses step S143, and returns to any of step S103 in FIG. 4, step S111 in FIG. 6, and step S121 in FIG. 7, and watching continues.

According to the present example embodiment, a specific person being a surveillance target can be specified by using a list by group or by individual, a list by district, a list limited by a period, a list limited by a date and time, or the like, and a notification can be made. An operation of the approaching person 30 not only being strange, but also being a person more likely to be involved in a crime can be notified to a user. According to the present example embodiment, an effect similar to that in the example embodiments described above can be achieved, a possibility that a user can take more appropriate action to protect himself/herself can be increased, and criminal damage can be suppressed.

Fourth Example Embodiment

Functional Configuration Example

A surveillance system 1 according to the present example embodiment is similar to that in the example embodiments described above other than a point that the surveillance system 1 according to the present example embodiment has a configuration for performing surveillance by using a specific surveillance camera 5 among a plurality of surveillance cameras 5. Since the surveillance system 1 and a surveillance apparatus 100 according to the present example embodiment have the same component as that in the first example embodiment, description is given by using FIGS. 1 and 2. However, the present example embodiment can be combined as long as the present example embodiment is not inconsistent with at least any one of configurations in example embodiments described below.

As illustrated in FIG. 1, the surveillance system 1 includes the plurality of surveillance cameras 5. In the present example embodiment, a detection unit 102 causes an image processing apparatus 210 to perform processing on a captured image of a specific surveillance camera 5 among the plurality of surveillance cameras 5.

Figure 14A:
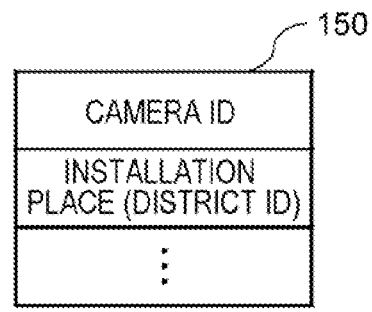
FIGS. 14A, 14B and 14C are diagrams each illustrating a data structure example of camera information and a district list.

The plurality of surveillance cameras 5 are installed in various areas. FIG. 14A is a diagram illustrating one example of a data structure of camera information 150. In the camera information 150, an installation place of the surveillance camera 5, for example, at least any one of identification information (district ID) about a district, an address, and longitude/latitude information is associated with identification information (camera ID) about the surveillance camera 5. Herein, a district ID is associated. The district ID is associated with a predetermined district (for example, a dangerous district, and the like). A camera ID may be, for example, an IP address of the surveillance camera 5.

A specific surveillance camera 5 used for surveillance may be able to be specified by group or by individual.

Figure 14B:
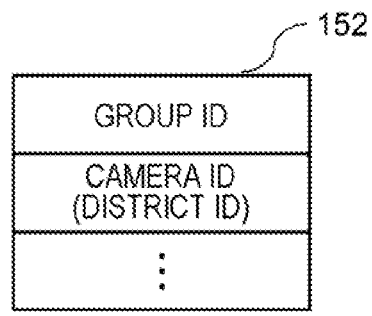
Figure 14C:
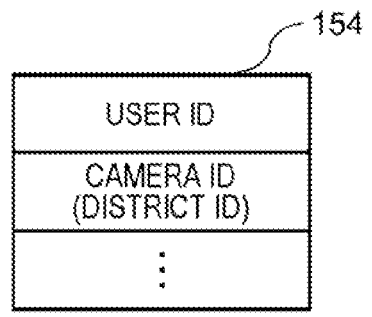

FIG. 14B is a diagram illustrating one example of a data structure of a group-specific district list 152. FIG. 14C is a diagram illustrating one example of a data structure of an individual-specific district list 154.

The group-specific district list 152 stores a camera ID of the surveillance camera 5 used for surveillance in association with identification information (group ID) about a group 20. Alternatively, the group-specific district list 152 may associate a district ID with a group ID. By using the district ID, the plurality of surveillance cameras 5 installed in a district indicated by the specified district ID can be collectively specified. Alternatively, a district ID and a camera ID may be combined, and specification may be able to be made by a logical expression of logical AND or logical OR.

The individual-specific district list 154 stores a camera ID of the surveillance camera 5 used for surveillance in association with identification information (user ID) about a user. Alternatively, the individual-specific district list 154 may associate a district ID with a user ID. By using the district ID, the plurality of surveillance cameras 5 installed in a district indicated by the specified district ID can be collectively specified. Alternatively, a district ID and a camera ID may be combined, and specification may be able to be made by a logical expression of logical AND or logical OR.

In other words, the detection unit 102 can perform image processing on a captured image of the surveillance camera 5 installed in a specific district, for example, a dangerous district, and can perform detection of a person 30 approaching the group 20 and not belonging to the group 20.

Operation Example

In the present example embodiment, in step S103 in FIG. 4 (or step S111 or step S115 in FIG. 6 or step S121 in FIG. 7), the detection unit 102 determines the surveillance camera 5 used for surveillance by referring to the group-specific district list 152 or the individual-specific district list 154, and causes the image processing apparatus 210 to perform image processing on a captured image of the determined surveillance camera 5. The other operation is the same as that in the first example embodiment.

According to the present example embodiment, an effect similar to that in the example embodiments described above can be achieved, and a dangerous district and the like can also be particularly surveyed predominantly since image processing can be performed on a captured image of a specific surveillance camera 5, that is, a specific district can be set as a surveillance target. Since the surveillance camera 5 used for surveillance is determined, a communication capacity for transmitting/receiving a captured image and a processing load on the image processing apparatus 210 can be reduced.

Fifth Example Embodiment

A surveillance system 1 according to the present example embodiment is similar to that in the example embodiments described above except for a point that the surveillance system 1 according to the present example embodiment has a configuration for performing image processing when positional information about a group 20 satisfies a reference.

Functional Configuration Example

Figure 15:
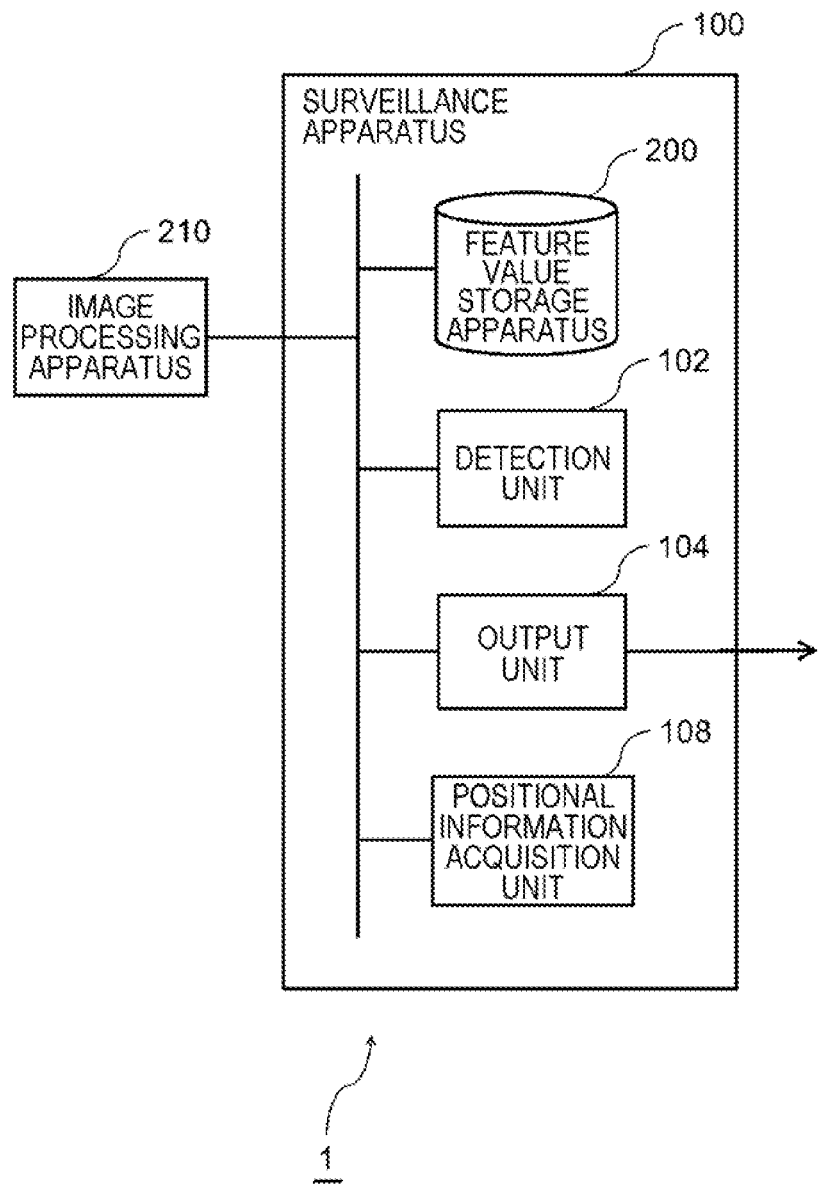
FIG. 15 is a functional block diagram illustrating a logical configuration example of a surveillance system according to an example embodiment.

FIG. 15 is a functional block diagram illustrating a logical configuration example of the surveillance system 1. The surveillance system 1 includes a feature value storage apparatus 200, a detection unit 102, and an output unit 104 that are the same as those of the surveillance apparatus 100 according to the example embodiment in FIG. 2, and further includes a positional information acquisition unit 108. In the example according to the present example embodiment in FIG. 15, an example combined with the configuration according to the first example embodiment in FIG. 2 is exemplified, but the present example embodiment may be combined as long as the present example embodiment is not inconsistent with at least any one of configurations in the other example embodiments.

The positional information acquisition unit 108 acquires positional information about the group 20. The detection unit 102 causes the image processing apparatus 210 to perform image processing when the positional information satisfies a reference.

The output unit 104 further outputs, when the positional information satisfies a reference, information indicating the satisfaction.

A method of acquiring positional information about the group 20 is exemplified below, which is not limited thereto. A plurality of acquisition methods may be combined. Herein, a user terminal 10 is a terminal carried by at least one person in the group 20.

(1) Current positional information acquired by using a global positioning system (GPS) of the user terminal 10 is acquired from the user terminal 10.
(2) Information in which the user terminal 10 performs position registration with a cellular phone base station is acquired from the base station.
(3) A GPS receiver other than the user terminal 10 carried by a user is registered in advance, and current positional information is acquired.
(4) A person 22 (user) of the group 20 is tracked from a captured image of a surveillance camera 5 by performing image recognition processing, and a position is estimated from an installation position of the surveillance camera 5 that captures the user.

Further, the user terminal 10 may have a function of the positional information acquisition unit 108 and a function of performing decision processing of whether positional information satisfies a reference. According to this configuration, positional information about the user terminal 10 does not need to be transmitted to a server apparatus at a surveillance center, and thus consumption of a communication capacity of the user terminal 10 can be suppressed.

A reference of positional information is an entry of a location of a user into a predetermined district (for example, a dangerous district), an approach (within a predetermined distance) to a specific place (for example, a location of a dangerous person), and the like. For the reference, a range of a predetermined district, a predetermined position, a distance from a position, and the like can be set. For setting of the reference, a user or an administrator of the surveillance system 1 may be able to perform setting.

Operation Example

Figure 16A:
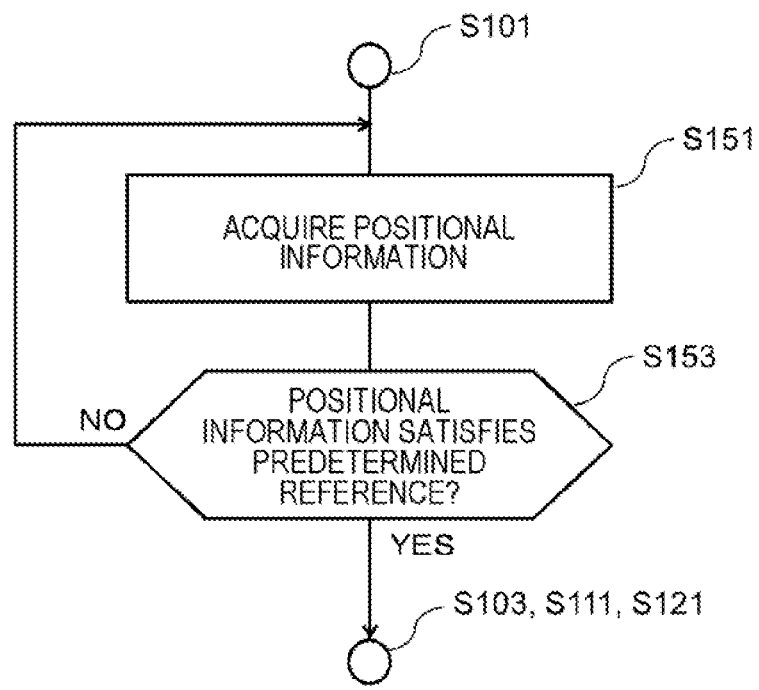
FIGS. 16A and 16B are flowcharts each illustrating an operation example of the surveillance system according to the example embodiment.

FIG. 16 is a flowchart illustrating an operation example of the surveillance system 1. A flow in FIG. 16A starts after step S101 in FIG. 4. The positional information acquisition unit 108 acquires positional information about the group 20 (step S151). Then, the detection unit 102 decides whether the positional information satisfies a reference (step S153). When the positional information satisfies the reference (YES in step S153), the processing proceeds to any of step S103 in FIG. 4, step S111 in FIG. 6, and step S121 in FIG. 7, and watching starts. When the positional information does not satisfy the reference (NO in step S153), the processing returns to step S151.

Figure 16B:
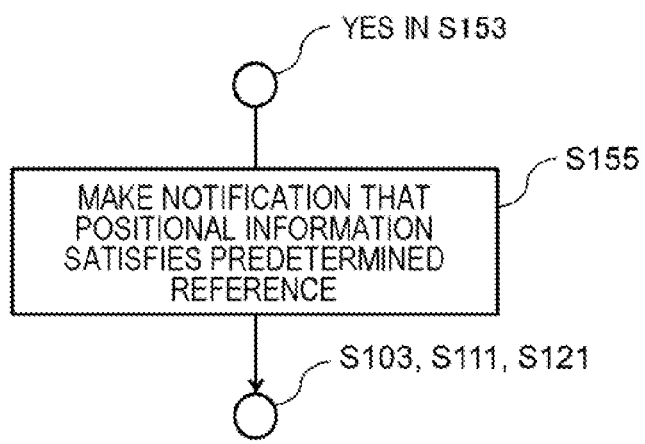

Furthermore, as illustrated in FIG. 16B, when YES is made in a decision in step S153 in FIG. 16A, the output unit 104 may make a notification that the positional information satisfies the predetermined reference (step S155). Then, the processing may proceed to any of step S103 in FIG. 4, step S111 in FIG. 6, and step S121 in FIG. 7, and watching may start.

For an output by the output unit 104, screen display can be performed on at least any one of the user terminal 10 of a user of the group 20 and a display of the server apparatus at the surveillance center, for example.

Figure 17:
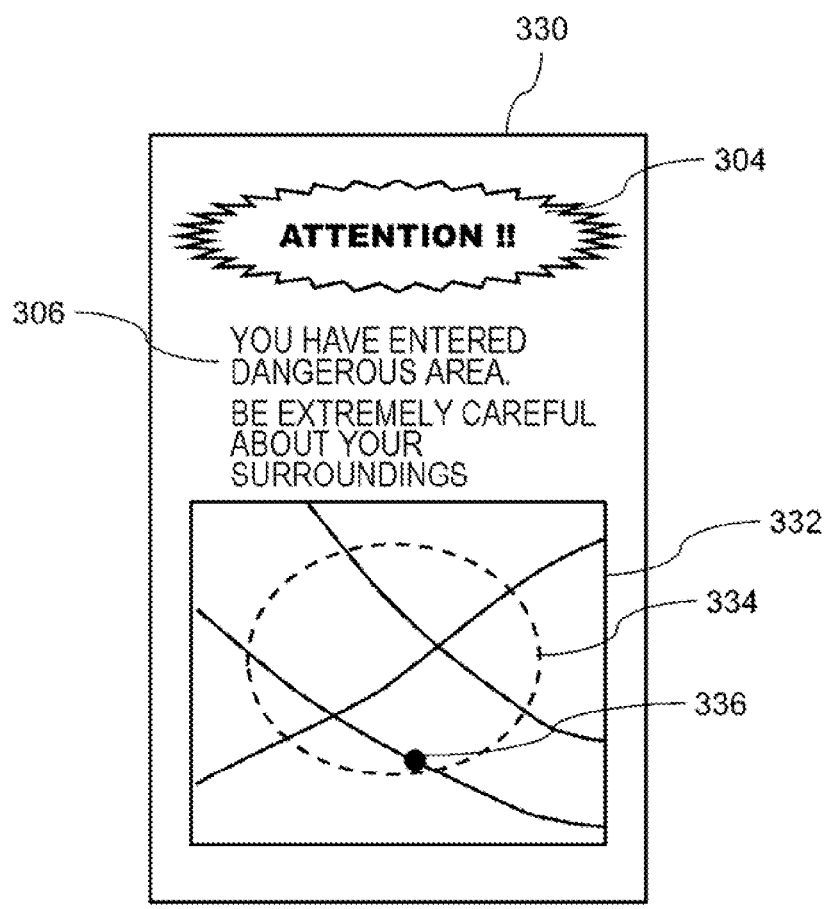
FIG. 17 is a diagram illustrating one example of an entry notification screen.

FIG. 17 is a diagram illustrating one example of an entry notification screen 330 being displayed on the user terminal 10. The entry notification screen 330 includes an icon display portion 304, a message display portion 306, and a map display portion 332. The icon display portion 304 and the message display portion 306 are the same as those in the suspicious person notification screen 300 in FIG. 8, but a message displayed in the message display portion 306 is different. In the example in FIG. 17, a message informing a user that the group 20 has entered a dangerous area and calling attention is displayed in the message display portion 306.

The map display portion 332 includes a dangerous area display portion 334 and a current position mark 336. In the dangerous area display portion 334, a dangerous area in the map displayed in the map display portion 332 is indicated by a broken line. The broken line is one example, and various display methods, such as a color change and emphasized display, are conceivable. The current position mark 336 is an image (black dot in the drawing) indicating positional information about the group 20, and is displayed in a corresponding position on the map.

Figure 18:
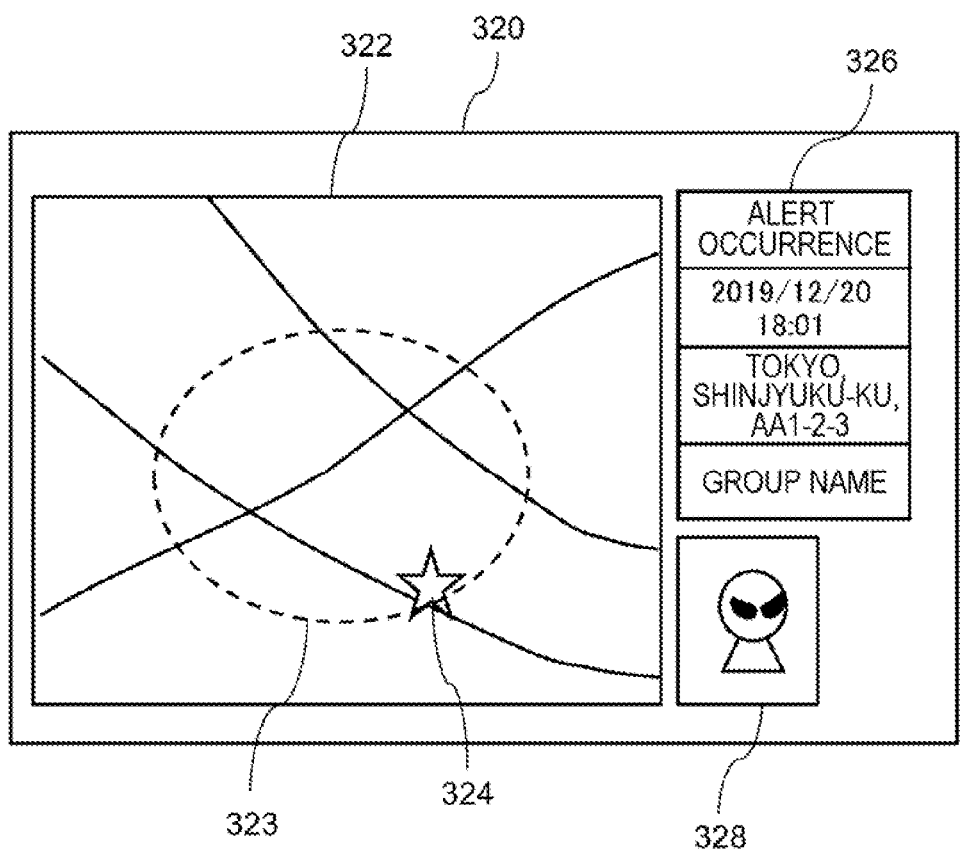
FIG. 18 is a diagram illustrating one example of a surveillance screen.

Furthermore, in the present example embodiment, the output unit 104 may display positional information acquired by the positional information acquisition unit 108 on the display of the server apparatus at the surveillance center. FIG. 18 is a diagram illustrating one example of a surveillance screen 320 being displayed on the display of the server apparatus at the surveillance center. The surveillance screen 320 includes a map display portion 322, a dangerous area display portion 323, a current position mark 324, an alert occurrence information display portion 326, and an approaching detected person image-display portion 328.

In the map display portion 322, a map of a district including a place where the group 20 and a user being a watched target are located is displayed. In the dangerous area display portion 323, a dangerous area in the map displayed in the map display portion 322 is indicated by a broken line. The broken line is one example, and various display methods, such as a color change and emphasized display, are conceivable. The current position mark 324 is an image (star mark in the drawing) indicating positional information about the group 20, and is displayed in a corresponding position on the map. In the alert occurrence information display portion 326, alert occurrence information is displayed as one of predetermined outputs when the output unit 104 performs the predetermined output.

As one example, in a case of the first example embodiment, an alert occurrence date and time, a place, and a name of the group 20 are displayed as approach information about a suspicious person. In this example, in the approaching detected person image-display portion 328, an image acquired by cutting, from a captured image acquired from the surveillance camera 5, a region including a face of a person 30 is displayed. Further, a current position of the person 30 may be displayed, on the map in the map display portion 322, by being distinguished with a mark different from a current position of a watched target person. An acquisition method of positional information about the person 30 may be similar to (4) of the acquisition method of positional information about the group 20 described above in the fifth example embodiment.

According to the present example embodiment, since positional information about the group 20 and a user being a watched target can be acquired, and image processing can start when a specific district, for example, a dangerous district is entered, the processing can be stopped in a district other than a dangerous district, and thus a processing load on the server apparatus at the surveillance center can be reduced. Further, an entry into a dangerous district can be notified to a user of the group 20 or the server apparatus at the surveillance center, and thus attention of a user and an administrator at the surveillance center can be called, and an improvement in a crime prevention effect can be expected.

Sixth Example Embodiment

A surveillance system 1 according to the present example embodiment is similar to that in the example embodiments described above other than a point that the surveillance system 1 according to the present example embodiment has a configuration for registering a face image of a group 20 and a user being a watched target or a specific surveillance target person.

Functional Configuration Example

Figure 19:
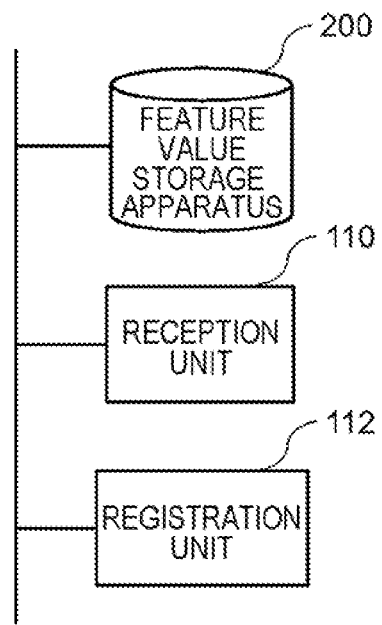
FIG. 19 is a functional block diagram illustrating a logical configuration example of a surveillance apparatus according to an example embodiment.

FIG. 19 is a functional block diagram illustrating a logical configuration example of a surveillance apparatus 100. The surveillance apparatus 100 has a configuration similar to that in at least any one of the configurations in the example embodiments described above, and further includes a reception unit 110 and a registration unit 112.

The reception unit 110 provides a face image of a person 30 (a person whose feature value is not registered in a feature value storage apparatus 200) determined not to be a watched target by a detection unit 102, causes an operator to select whether to register the face image, and receives an input of the operator. The registration unit 112 registers the face image of the person in which registration of the face image is received. Herein, the operator is a user, a supervisor or an administrator at a surveillance center, or the like.

Figure 20:
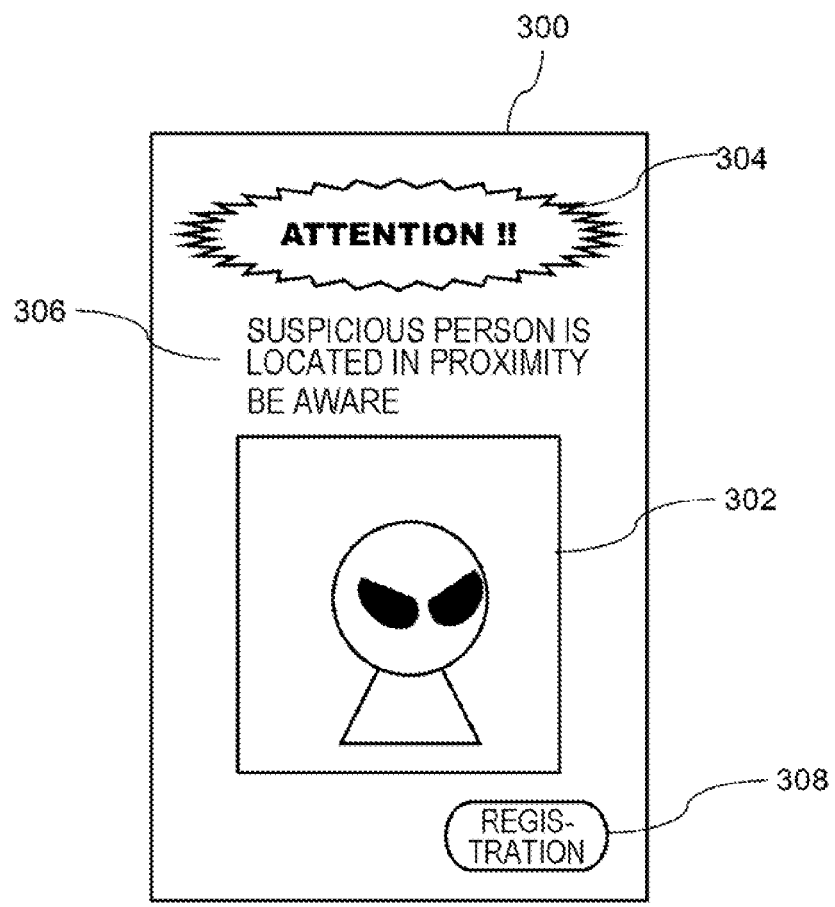
FIG. 20 is a diagram illustrating another example of a suspicious person notification screen.

FIG. 20 is a diagram illustrating an example in which a registration button 308 is further provided to the suspicious person notification screen 300 in FIG. 8. When a push of the registration button 308 is received in the suspicious person notification screen 300, the screen shifts to a registration screen 340 in FIG. 21. The registration screen 340 in FIG. 21 includes a registration candidate image display portion 342, a message display portion 344, a specific person registration button 346, a group registration button 347, and a non-registration button 348.

In the registration candidate image display portion 342, a detected face image of a person not belonging to a group is displayed. In the message display portion 344, a message inquiring about whether to register a person displayed in the registration candidate image display portion 342.

The specific person registration button 346 receives an operation of registering a person displayed in the registration candidate image display portion 342 as a specific person. When this operation is received, the screen shifts to a screen (not illustrated) for inputting person information, and after the input is received, the registration unit 112 extracts a feature value from a face image of the person, and registers the face image in the specific person information 140 in FIG. 11A. The person information is not particularly limited, but includes a category and the like to be registered in the list described in the third example embodiment.

The group registration button 347 receives an operation of registering a person displayed in the registration candidate image display portion 342 as a member of a group. When this operation is received, the screen shifts to a screen (not illustrated) for inputting person information, and after the input is received, the registration unit 112 extracts a feature value from a face image of the person, and registers the face image in the user registration information 130 in FIG. 5A and the group registration information 132.

The non-registration button 348 receives an operation of not registering a person displayed in the registration candidate image display portion 342. When this operation is received, the registration screen 340 is closed. Before the registration screen 340 is closed, a confirmation may be made by displaying a message inquiring about whether to discard an image of a person displayed in the registration candidate image display portion 342.

Figure 21:
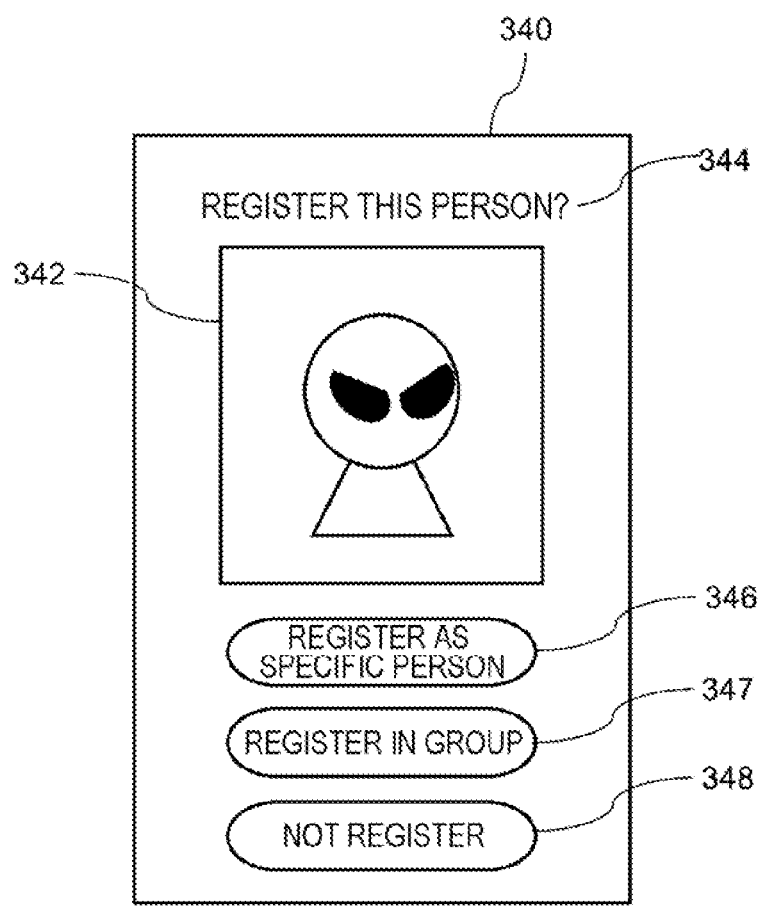
FIG. 21 is a diagram illustrating one example of a registration screen.

In the example in FIG. 21, the example in which the registration screen 340 is displayed on a user terminal 10 is exemplified, but the registration screen 340 may be displayed on a server apparatus at the surveillance center, and registration processing may be able to be performed.

According to the present example embodiment, a person not being registered in the feature value storage apparatus 200 can be further registered as a specific person being a surveillance target or a member of the group 20.

While the example embodiments of the present invention have been described with reference to the drawings, the example embodiments are only exemplification of the present invention, and various configurations other than the above-described example embodiments can also be employed.

The invention of the present application is described above with reference to the example embodiments and the examples, but the invention of the present application is not limited to the example embodiments and the examples described above. Various modifications that can be understood by those skilled in the art can be made to the configuration and the details of the invention of the present application within the scope of the invention of the present application.

Note that, when information related to a user is acquired and/or used in the present invention, this is lawfully performed.

Hereinafter, examples of reference manners are presented as supplementary notes.

1. A surveillance apparatus, including:
    a feature value storage unit that stores a feature value of a person being a watched target;
    a detection unit that detects an approach of a person not being the watched target to a person being the watched target within a reference distance by processing a captured image by using the feature value; and
    an output unit that performs a predetermined output by using a detection result of the detection unit.

2. The surveillance apparatus according to supplementary note 1, wherein
    the feature value storage unit associates and stores, as the watched target, a feature value of a person belonging to a same group, and
    the detection unit detects an approach of a person not belonging to the same group to a person belonging to the same group within a reference distance by processing a captured image by using the feature value.

3. A surveillance apparatus, including:
    a feature value storage unit that associates and stores a feature value of a person belonging to a same group;
    a detection unit that detects an approach of a person not belonging to the same group to a person belonging to the same group within a reference distance by processing a captured image by using the feature value; and
    an output unit that performs a predetermined output by using a detection result of the detection unit.

4. The surveillance apparatus according to supplementary note 3, wherein
    the feature value storage unit stores a feature value of a person being a watched target, and
    the detection unit detects an approach of a person not being the watched target to a person being the watched target within a reference distance.

5. The surveillance apparatus according to any one of supplementary notes 1 to 4, wherein
    the output unit performs the predetermined output when a state where a person not being the watched target is approaching a person being the watched target within a reference distance is maintained for equal to or longer than a reference period of time.

6. The surveillance apparatus according to any one of supplementary notes 1 to 5, further including
    a decision unit that decides whether a person approaching a person being the watched target within the reference distance is included in a predetermined list, wherein
    the output unit further outputs, when it is decided that the approaching person is included in the predetermined list, information indicating the decision.

7. The surveillance apparatus according to supplementary note 6, wherein
    the predetermined list is created by group or by individual.

8. The surveillance apparatus according to any one of supplementary notes 1 to 7, including
    a plurality of cameras, wherein
    the detection unit performs the processing on a captured image of a specific camera among the plurality of cameras.

9. The surveillance apparatus according to any one of supplementary notes 1 to 8, further including
    a positional information acquisition unit that acquires positional information about a person being the watched target, wherein
    the detection unit performs the processing when the positional information satisfies a reference.

10. The surveillance apparatus according to supplementary note 9, wherein
    the output unit further outputs, when the positional information satisfies a reference, information indicating the satisfaction.

11. The surveillance apparatus according to any one of supplementary notes 1 to 10, including:
    a reception unit that provides a detected face image of a person not being the watched target, causing an operator to select whether to register the face image, and receives an input of the operator; and
    a registration unit that registers the face image of the person in which registration of the face image is received.

12. A surveillance system, including:
    at least one camera that captures a person located at a place being a watched target;
    an image processing apparatus; and
    a surveillance apparatus, wherein
    the surveillance apparatus includes
        a feature value storage unit that associates and stores a feature value of a person being a watched target,
        a detection unit that detects an approach of a person not being the watched target to a person being the watched target within a reference distance by causing the image processing apparatus to process a captured image of the camera by using the feature value, and
        an output unit that performs a predetermined output by using a detection result of the detection unit.

13. The surveillance system according to supplementary note 12, wherein
    the feature value storage unit of the surveillance apparatus associates and stores, as the watched target, a feature value of a person belonging to a same group, and
    the detection unit of the surveillance apparatus detects an approach of a person not belonging to the same group to a person belonging to the same group within a reference distance by processing a captured image by using the feature value.

14. A surveillance system, including:
    at least one camera that captures a person located at a place being a watched target;
    an image processing apparatus; and
    a surveillance apparatus, wherein
    the surveillance apparatus includes
        a feature value storage unit that associates and stores a feature value of a person belonging to a same group;
        a detection unit that detects an approach of a person not belonging to the same group to a person belonging to the same group within a reference distance by processing a captured image by using the feature value; and an output unit that performs a predetermined output by using a detection result of the detection unit.

15. The surveillance system according to supplementary note 14, wherein the feature value storage unit of the surveillance apparatus stores a feature value of a person being a watched target, and the detection unit of the surveillance apparatus detects an approach of a person not being the watched target to a person being the watched target within a reference distance.

16. The surveillance system according to any one of supplementary notes 12 to 15, wherein the output unit of the surveillance apparatus performs the predetermined output when a state where a person not being the watched target is approaching a person being the watched target within a reference distance is maintained for equal to or longer than a reference period of time.

17. The surveillance system according to any one of supplementary notes 12 to 16, wherein the surveillance apparatus further includes a decision unit that decides whether a person approaching a person being the watched target within the reference distance is included in a predetermined list, and the output unit of the surveillance apparatus further outputs, when the decision unit of the surveillance apparatus decides that the approaching person is included in the predetermined list, information indicating the decision.

18. The surveillance system according to supplementary note 17, wherein the predetermined list is created by group or by individual.

19. The surveillance system according to any one of supplementary notes 12 to 18, including a plurality of the cameras, wherein the detection unit of the surveillance apparatus performs the processing on a captured image of a specific camera among the plurality of cameras.

20. The surveillance system according to any one of supplementary notes 12 to 19, wherein the surveillance apparatus further includes a positional information acquisition unit that acquires positional information about a person being the watched target, and the detection unit of the surveillance apparatus causes the image processing apparatus to perform the processing when the positional information satisfies a reference.

21. The surveillance system according to supplementary note 20, wherein the output unit of the surveillance apparatus further outputs, when the positional information satisfies a reference, information indicating the satisfaction.

22. The surveillance system according to any one of supplementary notes 12 to 21, wherein the surveillance apparatus includes a reception unit that provides a detected face image of a person not being the watched target, causing an operator to select whether to register the face image, and receives an input of the operator, and a registration unit that registers the face image of the person in which registration of the face image is received.

23. A surveillance method, including:

by a surveillance apparatus, associating and storing a feature value of a person being a watched target in a feature value storage unit;

detecting an approach of a person not being the watched target to a person being the watched target within a reference distance by processing a captured image by using the feature value; and performing a predetermined output by using the detected result.

24. The surveillance method according to supplementary note 23, further including:

by the surveillance apparatus, associating and storing, as the watched target, a feature value of a person belonging to a same group in the feature value storage unit; and detecting an approach of a person not belonging to the same group to a person belonging to the same group within a reference distance by processing a captured image by using the feature value.

25. A surveillance method, including:

by the surveillance apparatus, associating and storing a feature value of a person belonging to a same group in a feature value storage unit;

detecting an approach of a person not belonging to the same group to a person belonging to the same group within a reference distance by processing a captured image by using the feature value; and performing a predetermined output by using a result of the detection.

26. The surveillance method according to supplementary note 25, further including:

by the surveillance apparatus, storing a feature value of a person being a watched target in the feature value storage unit; and detecting an approach of a person not being the watched target to a person being the watched target within a reference distance.

27. The surveillance method according to any one of supplementary notes 23 to 26, further including, by the surveillance apparatus, performing the predetermined output when a state where a person not being the watched target is approaching a person being the watched target within a reference distance is maintained for equal to or longer than a reference period of time.

28. The surveillance method according to any one of supplementary notes 23 to 27, further including:

by the surveillance apparatus, deciding whether a person approaching a person being the watched target within the reference distance is included in a predetermined list; and outputting, when it is decided that the approaching person is included in the predetermined list, information indicating the decision.

29. The surveillance method according to supplementary note 28, wherein the predetermined list is created by group or by individual.

30. The surveillance method according to any one of supplementary notes 23 to 29, further including, by the surveillance apparatus, performing the processing on a captured image of a specific camera among a plurality of cameras.

31. The surveillance method according to any one of supplementary notes 23 to 30, further including:
by the surveillance apparatus,
acquiring positional information about a person being the watched target; and
performing the processing when the positional information satisfies a reference.

32. The surveillance method according to supplementary note 31, further including,
by the surveillance apparatus,
outputting, when the positional information satisfies a reference, information indicating the satisfaction.

33. The surveillance method according to any one of supplementary notes 23 to 32, further including:
by the surveillance apparatus,
providing a detected face image of a person not being the watched target, causing an operator to select whether to register the face image, and receiving an input of the operator; and
registering the face image of the person in which registration of the face image is received.

34. A program for causing a computer to execute:
a procedure of associating and storing a feature value of a person being a watched target in a feature value storage unit;
a procedure of detecting an approach of a person not being the watched target to a person being the watched target within a reference distance by processing a captured image by using the feature value; and
a procedure of performing a predetermined output by using a detection result of the procedure of detecting.

35. The program according to supplementary note 34, for further causing a computer to execute:
a procedure of associating and storing, as the watched target, a feature value of a person belonging to a same group in the feature value storage unit; and
a procedure of detecting an approach of a person not belonging to the same group to a person belonging to the same group within a reference distance by processing a captured image by using the feature value.

36. A program for causing a computer to execute:
a procedure of associating and storing a feature value of a person belonging to a same group in a feature value storage unit;
a procedure of detecting an approach of a person not belonging to the same group to a person belonging to the same group within a reference distance by processing a captured image by using the feature value; and
a procedure of performing a predetermined output by using a detection result of the procedure of detecting.

37. The program according to supplementary note 36, for further causing a computer to execute:
a procedure of storing a feature value of a person being a watched target in the feature value storage unit; and
a procedure of detecting an approach of a person not being the watched target to a person being the watched target within a reference distance.

38. The program according to any one of supplementary notes 34 to 37, for further causing a computer to execute
a procedure of performing the predetermined output when a state where a person not being the watched target is approaching a person being the watched target within a reference distance is maintained for equal to or longer than a reference period of time.

39. The program according to any one of supplementary notes 34 to 38, for further causing a computer to execute:
a procedure of deciding whether a person approaching a person being the watched target within the reference distance is included in a predetermined list; and
a procedure of outputting, when it is decided that the approaching person is included in the predetermined list, information indicating the decision.

40. The program according to supplementary note 39, wherein
the predetermined list is created by group or by individual.

41. The program according to any one of supplementary notes 34 to 40, for further causing a computer to execute
a procedure of performing the processing on a captured image of a specific camera among a plurality of cameras.

42. The program according to any one of supplementary notes 34 to 41, for further causing a computer to execute:
a procedure of acquiring positional information about a person being the watched target; and
a procedure of performing the processing when the positional information satisfies a reference.

43. The program according to supplementary note 42, for further causing a computer to execute
a procedure of outputting, when the positional information satisfies a reference, information indicating the satisfaction.

44. The program according to any one of supplementary notes 34 to 43, for further causing a computer to execute:
a procedure of providing a detected face image of a person not being the watched target, causing an operator to select whether to register the face image, and receiving an input of the operator; and
a procedure of registering the face image of the person in which registration of the face image is received.

REFERENCE SIGNS LIST

1 Surveillance system
3 Communication network
5 Surveillance camera
10 User terminal
20 Group
22 Person
30 Person
100 Surveillance apparatus
102 Detection unit
104 Output unit
106 Decision unit
108 Positional information acquisition unit
110 Reception unit
112 Registration unit
130 User registration information
132 Group registration information
140 Specific person information
142 Group-specific person list
144 Individual-specific person list
150 Camera information
152 Group-specific district list
154 Individual-specific district list
200 Feature value storage apparatus
210 Image processing apparatus
300 Suspicious person notification screen
302 Person image display portion
304 Icon display portion
306 Message display portion
308 Registration button
310 Warning screen 320 Surveillance screen
322 Map display portion
323 Dangerous area display portion
324 Current position mark
326 Alert occurrence information display portion
328 Approaching detected person image-display portion
330 Entry notification screen
332 Map display portion
334 Dangerous area display portion
336 Current position mark
340 Registration screen
342 Registration candidate image display portion
344 Message display portion
346 Specific person registration button
347 Group registration button
348 Non-registration button
1000 Computer
1010 Bus
1020 Processor
1030 Memory
1040 Storage device
1050 Input/output interface
1060 Network interface

The invention claimed is:

1. A surveillance apparatus comprising:
at least one memory storing instructions; and
at least one processor configured to execute the instructions to:
store a feature value of a person being a watched target, in a feature value storage unit;
distinguish, by processing a captured image, from among a plurality of persons in the captured image, a person of which a feature value is not stored in the feature value storage unit as not being the watched target;
detect approach of the person not being the watched target to the person being the watched target within a reference distance by processing the captured image by using the feature value of the person being the watched target; and
perform a predetermined output by using a detection result.

2. The surveillance apparatus according to claim 1, wherein
the person being the watched target is one of a plurality of first persons that are each the watched target, and the person not being watched target is one of a plurality of second persons, and
the at least one processor is further configured to execute the instructions to:
associate and store feature values of the plurality of first persons as belonging to a same group; and
distinguish, from among the plurality of persons in the captured image and as the person not being the watched target, one of the plurality of second persons of which feature values are not stored in the feature value storage unit and who do not belong to the group that the plurality of first persons belong to.

3. The surveillance apparatus according to claim 1, wherein
the at least one processor is further configured to execute the instructions to
perform the predetermined output when a state where the person not being the watched target is approaching the person being the watched target within a reference distance is maintained for equal to or longer than a reference period of time.

4. The surveillance apparatus according to claim 1,
the at least one processor is further configured to execute the instructions to:
decide whether a person approaching the person being the watched target within the reference distance is included in a predetermined list; and further output, when having decided that the approaching person is included in the predetermined list, information indicating the decision.

5. The surveillance apparatus according to claim 4, wherein
the predetermined list is created by group or by individual.

6. The surveillance apparatus according to claim 1, further comprising
a plurality of cameras, wherein
the at least one processor is further configured to execute the instructions to
perform the processing on the captured image as captured by a specific camera among the plurality of cameras.

7. The surveillance apparatus according to claim 1,
wherein the at least one processor is further configured to execute the instructions to:
acquire positional information about the person being the watched target; and
perform the processing when the positional information satisfies a reference.

8. The surveillance apparatus according to claim 7, wherein
the at least one processor is further configured to execute the instructions to
further output, when the positional information satisfies the reference, information indicating the satisfaction.

9. The surveillance apparatus according to claim 1,
wherein the at least one processor is further configured to execute the instructions to:
provide a detected face image of the person not being the watched target, causing an operator to select whether to register the face image, and receive an input of the operator; and
register the face image of the person in which registration of the face image is received.

10. A surveillance method performed by a surveillance apparatus and comprising:
storing a feature value of a person being a watched target in a feature value storage unit;
distinguishing, by processing a captured image, from among a plurality of persons in the captured image, a person of which a feature value is not stored in the feature value storage unit as not being the watched target;
detecting approach of the person not being the watched target to the person being the watched target within a reference distance by processing the captured image by using the feature value of the person being the watched target; and
performing a predetermined output by using the detected result.

11. The surveillance method according to claim 10, wherein
the person being the watched target is one of a plurality of first persons that are each the watched target, and the person not being watched target is one of a plurality of second persons, and
the method further comprises:
associating and storing feature values of the plurality of first persons as belonging to a same group; and
distinguishing, from among the plurality of persons in the captured image and as the person not being the watched target, one of the plurality of second persons of which feature values are not stored in the feature value storage unit and who do not belong to the group that the plurality of first persons belong to.

12. The surveillance method according to claim 10, further comprising
performing the predetermined output when a state where the person not being the watched target is approaching the person being the watched target within a reference distance is maintained for equal to or longer than a reference period of time.

13. The surveillance method according to claim 10, further comprising
deciding whether a person approaching the person being the watched target within the reference distance is included in a predetermined list; and
outputting, when having decided that the approaching person is included in the predetermined list, information indicating the decision.

14. The surveillance method according to claim 13, wherein
the predetermined list is created by group or by individual.

15. The surveillance method according to claim 10, further comprising
performing the processing on the captured image as captured by a specific camera among a plurality of cameras.

16. The surveillance method according to claim 10, further comprising:
acquiring positional information about the person being the watched target; and
performing the processing when the positional information satisfies a reference.

17. The surveillance method according to claim 16, further comprising
outputting, when the positional information satisfies the reference, information indicating the satisfaction.

18. The surveillance method according to claim 10, further comprising:
providing a detected face image of the person not being the watched target, causing an operator to select whether to register the face image, and receiving an input of the operator; and
registering the face image of the person in which registration of the face image is received.

19. A non-transitory computer-readable storage medium storing a program for causing a computer to execute processing comprising:
storing a feature value of a person being a watched target in a feature value storage unit;
distinguishing, by processing a captured image, from among a plurality of persons in the captured image, a person of which a feature value is not stored in the feature value storage unit as not being the watched target;
detecting approach of the person not being the watched target to the person being the watched target within a reference distance by processing the captured image by using the feature value of the person being the watched target; and
performing a predetermined output by using a detection result of the procedure of detecting.

20. The non-transitory computer-readable storage medium according to claim 19, wherein
the person being the watched target is one of a plurality of first persons that are each the watched target, and the person not being watched target is one of a plurality of second persons, and
the processing further comprises:
associating and storing feature values of the plurality of first persons as belonging to a same group; and
distinguishing, from among the plurality of persons in the captured image and as the person not being the watched target, one of the plurality of second persons of which feature values are not stored in the feature value storage unit and who do not belong to the group that the plurality of first persons belong to.

* * * * *